US012812120B2

(12) United States Patent
Ko et al.

(10) Patent No.: US 12,812,120 B2
(45) **Date of Patent: *Nov. 24, 2026**

(54) INTRA PREDICTION-BASED VIDEO SIGNAL PROCESSING METHOD AND DEVICE

(71) Applicant: VIDAXIO LLC, Wilmington, DE (US)

(72) Inventors: Geonjung Ko, Seoul (KR); Dongcheol Kim, Suwon-si (KR); Juhyung Son, Uiwang-si (KR); Jaehong Jung, Seoul (KR); Jinsam Kwak, Uiwang-si (KR)

(73) Assignee: VIDAXIO LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/055,147

(22) Filed: Feb. 17, 2025

(65) Prior Publication Data

US 2025/0193401 A1 Jun. 12, 2025

Related U.S. Application Data

(63) Continuation of application No. 17/401,849, filed on Aug. 13, 2021, now Pat. No. 12,328,431, which is a (Continued)

(30) Foreign Application Priority Data

Feb. 19, 2019 (KR) ........................ 10-2019-0019512
Apr. 3, 2019 (KR) ........................ 10-2019-0039132

(51) Int. Cl.
*H04N 19/132* (2014.01)
*H04N 19/159* (2014.01)
(Continued)

(52) U.S. Cl.
CPC ......... *H04N 19/132* (2014.11); *H04N 19/159* (2014.11); *H04N 19/176* (2014.11);
(Continued)

(58) Field of Classification Search
CPC .... H04N 19/105; H04N 19/11; H04N 19/119; H04N 19/132; H04N 19/159;
(Continued)

(56) References Cited

U.S. PATENT DOCUMENTS 10,448,025 B1 10/2019 Xu et al.
12,003,699 B2 6/2024 Ko et al.
(Continued)

FOREIGN PATENT DOCUMENTS

JP 2020-28066 A 2/2020
JP 7733196 B2 8/2025
(Continued)

OTHER PUBLICATIONS

Notice of Allowance for JP 2024-191166 by Japan Patent Office dated Jul. 22, 2025.

(Continued)

*Primary Examiner* — Shahan Ur Rahaman
(74) *Attorney, Agent, or Firm* — Merchant & Gould P.C.

(57) ABSTRACT

A video signal processing method and device for encoding or decoding a video signal are disclosed. The video signal processing method comprises the steps of: identifying a tree type of a current chroma block; deriving a chroma intra prediction mode of the current chroma block on the basis of a luma intra prediction mode at a preset position if the tree type of the current chroma block is a dual tree; generating a prediction block of the current chroma block on the basis of the chroma intra prediction mode; and restoring the current chroma block by adding a residual block of the current chroma block to a prediction block, wherein the luma intra prediction mode can be set to a preset mode if the luma prediction mode at the preset position is an intra block copy mode.

9 Claims, 15 Drawing Sheets

Related U.S. Application Data continuation of application No. PCT/KR2020/095004, filed on Feb. 19, 2020.

(51) Int. Cl.

| | |
|---|---|
| ***H04N 19/176*** | (2014.01) |
| ***H04N 19/186*** | (2014.01) |
| ***H04N 19/70*** | (2014.01) |
| ***H04N 19/96*** | (2014.01) |

(52) U.S. Cl.

CPC .......... *H04N 19/186* (2014.11); *H04N 19/70* (2014.11); *H04N 19/96* (2014.11)

(58) Field of Classification Search

CPC .............. H04N 19/176; H04N 19/186; H04N 19/593; H04N 19/70; H04N 19/96

See application file for complete search history.

(56) References Cited

U.S. PATENT DOCUMENTS

| | | | |
|---|---|---|---|
| 12,328,431 B2 | 6/2025 | Ko et al. | |
| 2014/0092970 A1 | 4/2014 | Misra et al. | |
| 2016/0105682 A1 | 4/2016 | Rapaka et al. | |
| 2020/0045322 A1 * | 2/2020 | Ye ........................ | H04N 19/159 |
| 2021/0092405 A1 | 3/2021 | Biatek et al. | |

FOREIGN PATENT DOCUMENTS

| | | |
|---|---|---|
| WO | 2016/048834 A1 | 3/2016 |
| WO | 2018051811 A1 | 3/2018 |
| WO | 2018116925 A1 | 6/2018 |
| WO | 2019/217189 A1 | 11/2019 |
| WO | 2020/098782 A1 | 5/2020 |
| WO | 2020116848 A1 | 6/2020 |

OTHER PUBLICATIONS

Office Action for JP 2024-045270 by Japan Patent Office dated Mar. 25, 2025.

Chien, Wei-Jung et al., "CE8-related: CPR mode signaling and interaction with inter coding tools," Joint Video Experts Team (JVET) of ITU-T SG 16 WP 3 and ISO/IEC JTC 1/SC 29/WG 11. Jan. 2019. doc: JVET-M0483-r2.

Xu, Xiaozhong et al., "Non-CE8: CPR with chroma 4×4 sub-block size when dual-tree is on," Joint Video Experts Team (JVET) of ITU-T SG 16 WP 3 and ISO/IEC JTC 1/SC 29/WG 11. Jan. 2019. doc: JVET-M0544-v1.

Notice of Allowance for U.S. Appl. No. 17/401,849 by United States Patent and Trademark Office dated Mar. 28, 2025.

Office Action for U.S. Appl. No. 18/645,298 by United States Patent and Trademark Office dated Apr. 22, 2025.

Notice of Reasons for Rejection issued in corresponding Chinese Patent Application No. 2025-138360 mailed May 19, 2026 (with English translation).

Luong Pham Van, et al., Non-CE8: Intra prediction mode derivation for DM chroma block with corresponding IBC/PCM luma, Joint Video Experts Team (JVET) of ITU-T SG 16 WP 3 and ISO/IEC JTC 1/SC 29/WG11, JVET-O0651-v2, Jul. 2019, pp. 1-2.

Man-Shu Chiang, et al., CE3-related: Chroma DM derivation for IBC and PCM, Joint Video Experts Team (JVET) of ITU-T SG 16 WP 3and ISO/IEC JTC 1/SC 29/WG 11, JVET-00275-v1, Jun. 2019, pp. 1-3.

Notice of Allowance issued in corresponding Chinese Patent Application No. 2025-138360 mailed Aug. 4, 2026.

* cited by examiner

FIG. 12

| | |
|---|---|
| coding_unit( x0, y0, cbWidth, cbHeight, treeType ) { | |
| if( tile_group_type != I \|\| sps_ibc_enabled_flag ) { | S1201 |
| if( treeType != DUAL_TREE_CHROMA ) | S1202 |
| **cu_skip_flag**[ x0 ][ y0 ] | |
| if( cu_skip_flag[ x0 ][ y0 ] = = 0 && tile_group_type != I)) | S1203 |
| **pred_mode_flag** | |
| if( ( tile_group_type = = I && cu_skip_flag[ x0 ][ y0 ] = =0 ) \|\| ( tile_group_type != I && (cu_skip_flag[ x0 ][ y0 ] \|\| CuPredMode[ x0 ][ y0 ] != MODE_INTRA ) ) && sps_ibc_enabled_flag && cbWidth < 32 && cbHeight < 32 ) | S1204 |
| **pred_mode_ibc_flag** | |
| } | |
| if( CuPredMode[ x0 ][ y0 ] = = MODE_INTRA ) { | S1205 |
| // Intra prediction | |
| } else if( treeType != DUAL_TREE_CHROMA ) { /* MODE_INTER or MODE_IBC */ | |
| if( cu_skip_flag[ x0 ][ y0 ] = = 0 ) | |
| **merge_flag**[ x0 ][ y0 ] | |
| if( merge_flag[ x0 ][ y0 ] ) { | |
| merge_data( x0, y0, cbWidth, cbHeight ) | |
| } else if ( CuPredMode[ x0 ][ y0 ] = = MODE_IBC ) { | |
| mvd_coding( x0, y0, 0, 0 ) | |
| **mvp_l0_flag**[ x0 ][ y0 ] | |
| if( sps_amvr_enabled_flag && ( MvdL0[ x0 ][ y0 ][ 0 ] != 0 \|\| MvdL0[ x0 ][ y0 ][ 1 ] != 0 ) ) { | |
| **amvr_4pel_flag**[ x0 ][ y0 ] | |
| } | |
| } else { | |
| // inter_pred_idc, inter_affine_flag, cu_affine_type_flag, ref_idx_l0, mvp_l0_flag, ref_idx_l1, mvp_l1_flag, mvd_coding, amvr_flag, amvr_4pel_flag, gdi_idx, etc. | |
| } | |
| } | |
| if( !pcm_flag[ x0 ][ y0 ] ) { | |
| if( CuPredMode[ x0 ][ y0 ] != MODE_INTRA && merge_flag[ x0 ][ y0 ] = = 0 ) | |
| **cu_cbf** | |
| if( cu_cbf ) | |
| transform_tree( x0, y0, cbWidth, cbHeight, treeType ) | |
| } | |
| } | |

FIG. 13

| | |
|---|---|
| coding_unit( x0, y0, cbWidth, cbHeight, treeType ) { | |
| if( tile_group_type != I \|\| sps_ibc_enabled_flag ) { | |
| if( treeType != DUAL_TREE_CHROMA ) | |
| **cu_skip_flag**[ x0 ][ y0 ] | |
| if( cu_skip_flag[ x0 ][ y0 ] = = 0 && tile_group_type != I)) | |
| **pred_mode_flag** | |
| if( ( tile_group_type = = I && cu_skip_flag[ x0 ][ y0 ] = =0 ) \|\| ( tile_group_type != I && (cu_skip_flag[ x0 ][ y0 ] \|\| CuPredMode[ x0 ][ y0 ] != MODE_INTRA ) ) && sps_ibc_enabled_flag && cbWidth < 32 && cbHeight < 32 && treeType != DUAL_TREE_CHROMA) | S1301 |
| **pred_mode_ibc_flag** | |
| } | |
| // ... | |
| } | |

FIG. 14

| | |
|---|---|
| coding_unit( x0, y0, cbWidth, cbHeight, treeType ) { | |
| // ... | |
| if( CuPredMode[ x0 ][ y0 ] = = MODE_INTRA ) { | |
| if( sps_pcm_enabled_flag && cbWidth >= MinIpcmCbSizeY && cbWidth <= MaxIpcmCbSizeY && cbHeight >= MinIpcmCbSizeY && cbHeight <= MaxIpcmCbSizeY ) | |
| **pcm_flag**[ x0 ][ y0 ] | |
| if( pcm_flag[ x0 ][ y0 ] ) { | |
| while( !byte_aligned( ) ) | |
| **pcm_alignment_zero_bit** | |
| pcm_sample( cbWidth, cbHeight, treeType) | |
| } else { | |
| if( treeType = = SINGLE_TREE \|\| treeType = = DUAL_TREE_LUMA ) { | |
| if( ( y0 % CtbSizeY ) > 0 ) | |
| **intra_luma_ref_idx**[ x0 ][ y0 ] | |
| if (intra_luma_ref_idx[ x0 ][ y0 ] = = 0 && ( cbWidth <= MaxTbSizeY \|\| cbHeight <= MaxTbSizeY ) && ( cbWidth * cbHeight > MinTbSizeY * MinTbSizeY )) | |
| **intra_subpartitions_mode_flag**[ x0 ][ y0 ] | |
| if( intra_subpartitions_mode_flag[ x0 ][ y0 ] = = 1 && cbWidth <= MaxTbSizeY && cbHeight <= MaxTbSizeY ) | |
| **intra_subpartitions_split_flag**[ x0 ][ y0 ] | |
| if( intra_luma_ref_idx[ x0 ][ y0 ] = = 0 && intra_subpartitions_mode_flag[ x0 ][ y0 ] = = 0 ) | |
| **intra_luma_mpm_flag**[ x0 ][ y0 ] | |
| if( intra_luma_mpm_flag[ x0 ][ y0 ] ) | |
| **intra_luma_mpm_idx**[ x0 ][ y0 ] | |
| else | |
| **intra_luma_mpm_remainder**[ x0 ][ y0 ] | |
| } | |
| if( treeType = = SINGLE_TREE \|\| treeType = = DUAL_TREE_CHROMA ) | S1401 |
| **intra_chroma_pred_mode**[ x0 ][ y0 ] | |
| } | |
| } else if( treeType != DUAL_TREE_CHROMA ) { /* MODE_INTER */ | |
| } | |
| // ... | |
| } | |

FIG. 15

Derivation process for chroma intra prediction mode

Input to this process are:

- a luma location ( xCb, yCb ) specifying the top-left sample of the current chroma coding block relative to the top-left luma sample of the current picture,
- a variable cbWidth specifying the width of the current coding block in luma samples,
- a variable cbHeight specifying the height of the current coding block in luma samples.

In this process, the chroma intra prediction mode IntraPredModeC[ xCb ][ yCb ] is derived.

The chroma intra prediction mode IntraPredModeC[ xCb ][ yCb ] is derived using intra_chroma_pred_mode[ xCb ][ yCb ] and IntraPredModeY[ xCb + cbWidth / 2 ][ yCb + cbHeight / 2 ].

FIG. 16

- If IntraPredModeY[ xCb + cbWidth / 2 ][ yCb + cbHeight / 2 ] is not present, it is set to the predefined value.

The chroma intra prediction mode IntraPredModeC[ xCb ][ yCb ] is derived using intra_chroma_pred_mode[ xCb ][ yCb ] and IntraPredModeY[ xCb + cbWidth / 2 ][ yCb + cbHeight / 2 ] as specified in Table 8-2 and Table 8-3.

FIG. 17

IntraPredModeY[ xCb ][ yCb ] is derived by applying the following procedure:

- If intra_luma_mpm_flag[ xCb ][ yCb ] is equal to 1, the IntraPredModeY[ xCb ][ yCb ] is set equal to candModeList[ intra_luma_mpm_idx[ xCb ][ yCb ] ].
- Otherwise, IntraPredModeY[ xCb ][ yCb ] is derived by applying the following ordered steps:
  1. When candModeList[ i ] is greater than candModeList[ j ] for i = 0..4 and for each i, j = ( i + 1 )..5, both values are swapped as follows:
     ( candModeList[ i ], candModeList[ j ] ) = Swap( candModeList[ i ], candModeList[ j ] )
  2. IntraPredModeY[ xCb ][ yCb ] is derived by the following ordered steps:
     i. IntraPredModeY[ xCb ][ yCb ] is set equal to intra_luma_mpm_remainder[ xCb ][ yCb ].
     ii. For i equal to 0 to 5, inclusive, when IntraPredModeY[ xCb ][ yCb ] is greater than or equal to candModeList[ i ], the value of IntraPredModeY[ xCb ][ yCb ] is incremented by one.

FIG. 18

- When a neighboring block is not available, its intra mode is set to Planar by default.
- If both modes *Left* and *Above* are non-angular modes:
  - MPM list → {Planar, DC, V, H, V-4, V+4}
- If one of modes *Left* and *Above* is angular mode, and the other is non-angular:
  - Set a mode *Max* as the larger mode in *Left* and *Above*
  - MPM list → {Planar, *Max*, DC, *Max -1*, *Max +1*, *Max -2*}
- If *Left* and *Above* are both angular and they are different:
  - Set a mode *Max* as the larger mode in *Left* and *Above*
  - if the difference of mode *Left* and *Above* is in the range of 2 to 62, inclusive
    - MPM list → {Planar, *Left*, *Above*, DC, *Max -1*, *Max +1*}
  - Otherwise
    - MPM list → {Planar, *Left*, *Above*, DC, *Max -2*, *Max +2*}
- If *Left* and *Above* are both angular and they are the same:
  - MPM list → {Planar, *Left*, *Left -1*, *Left +1*, DC, *Left -2*}

FIG. 19

IntraPredModeY[ xCb ][ yCb ] is derived by applying the following procedure:

- If intra_luma_mpm_flag[ xCb ][ yCb ] is equal to 1, the IntraPredModeY[ xCb ][ yCb ] is set equal to candModeList[ intra_luma_mpm_idx[ xCb ][ yCb ] ].
- Otherwise, IntraPredModeY[ xCb ][ yCb ] is derived by applying the following ordered steps:
  1. When candModeList[ i ] is greater than candModeList[ j ] for i = 1..4 and for each i, j = ( i + 1 )..5, both values are swapped as follows:
     ( candModeList[ i ], candModeList[ j ] ) = Swap( candModeList[ i ], candModeList[ j ] )
  2. IntraPredModeY[ xCb ][ yCb ] is derived by the following ordered steps:
     i. IntraPredModeY[ xCb ][ yCb ] is set equal to intra_luma_mpm_remainder[ xCb ][ yCb ].
     ii. The value of IntraPredModeY[ xCb ][ yCb ] is incremented by two.
     iii. For i equal to 2 to 5, inclusive, when IntraPredModeY[ xCb ][ yCb ] is greater than or equal to candModeList[ i ], the value of IntraPredModeY[ xCb ][ yCb ] is incremented by one.

FIG. 20

- When a neighboring block is not available, its intra mode is set to Planar by default.
- If both modes *Left* and *Above* are non-angular modes:
  - MPM list → {DC, V, H, V-4, V+4}
- If one of modes *Left* and *Above* is angular mode, and the other is non-angular:
  - Set a mode *Max* as the larger mode in *Left* and *Above*
  - MPM list → {*Max*, DC, *Max -1*, *Max +1*, *Max -2*}
- If *Left* and *Above* are both angular and they are different:
  - Set a mode *Max* as the larger mode in *Left* and *Above*
  - if the difference of mode *Left* and *Above* is in the range of 2 to 62, inclusive
    - MPM list → {*Left*, *Above*, DC, *Max -1*, *Max +1*}
  - Otherwise
    - MPM list → {*Left*, *Above*, DC, *Max -2*, *Max +2*}
- If *Left* and *Above* are both angular and they are the same:
  - MPM list → {*Left*, *Left -1*, *Left +1*, DC, *Left -2*}

FIG. 21

IntraPredModeY[ xCb ][ yCb ] is derived by applying the following procedure:

- If planar_flag[ xCb ][ yCb ] is equal to 1, the IntraPredModeY[ xCb ][ yCb ] is set equal to INTRA_PLANA R.
- Otherwise if intra_luma_mpm_flag[ xCb ][ yCb ] is equal to 1, the IntraPredModeY[ xCb ][ yCb ] is set equal to candModeList[ intra_luma_mpm_idx[ xCb ][ yCb ] ].
- Otherwise, IntraPredModeY[ xCb ][ yCb ] is derived by applying the following ordered steps:
  1. When candModeList[ i ] is greater than candModeList[ j ] for i = 0..3 and for each i, j = ( i + 1 )..4, bo th values are swapped as follows:

( candModeList[ i ], candModeList[ j ] ) = Swap( candModeList[ i ], candModeList[ j ] )
  2. IntraPredModeY[ xCb ][ yCb ] is derived by the following ordered steps:
     i. IntraPredModeY[ xCb ][ yCb ] is set equal to intra_luma_mpm_remainder[ xCb ][ yCb ].

ii. The value of IntraPredModeY[ xCb ][ yCb ] is incremented by one.

iii. For i equal to 0 to 4, inclusive, when IntraPredModeY[ xCb ][ yCb ] is greater than or equal to candModeList[ i ], the value of IntraPredModeY[ xCb ][ yCb ] is incremented by one.

FIG. 22

IntraPredModeY[ xCb ][ yCb ] is derived by applying the following procedure:

- If planar_flag[ xCb ][ yCb ] is equal to 1, the IntraPredModeY[ xCb ][ yCb ] is set equal to INTRA_PLANA R.
- Otherwise if intra_luma_mpm_flag[ xCb ][ yCb ] is equal to 1, the IntraPredModeY[ xCb ][ yCb ] is set equal to candModeList[ intra_luma_mpm_idx[ xCb ][ yCb ] ].
- Otherwise, IntraPredModeY[ xCb ][ yCb ] is derived by applying the following ordered steps:
  1. When candModeList[ i ] is greater than candModeList[ j ] for i = 0..3 and for each i, j = ( i + 1 )..4, bo th values are swapped as follows:

( candModeList[ i ], candModeList[ j ] ) = Swap( candModeList[ i ], candModeList[ j ] )
  2. IntraPredModeY[ xCb ][ yCb ] is derived by the following ordered steps:
     i. IntraPredModeY[ xCb ][ yCb ] is set equal to intra_luma_mpm_remainder[ xCb ][ yCb ].
     ii. The value of IntraPredModeY[ xCb ][ yCb ] is incremented by two.
     iii. For i equal to 1 to 4, inclusive, when IntraPredModeY[ xCb ][ yCb ] is greater than or equal to candModeList[ i ], the value of IntraPredModeY[ xCb ][ yCb ] is incremented by one.

INTRA PREDICTION-BASED VIDEO SIGNAL PROCESSING METHOD AND DEVICE

CROSS-REFERENCE TO RELATED APPLICATIONS

This application is a continuation of U.S. application Ser. No. 17/401,849, filed on Aug. 13, 2021, which is a continuation of PCT International Application No. PCT/KR2020/095004, filed on Feb. 19, 2020, which claims priority to Korean Patent Application No. 10-2019-0019512 filed on Feb. 19, 2019 and Korean Patent Application No. 10-2019-0039132 filed on Apr. 3, 2019, the entire contents of which are hereby incorporated by references in its entirety.

TECHNICAL FIELD

The present disclosure relates to a video signal processing method and device and, more specifically, to a video signal processing method and device by which a video signal is encoded or decoded based on intra prediction.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF INVENTION

Technical Problem

The present disclosure is to improve the coding efficiency of a video signal.

Solution to Problem

In order to solve the above problems, the present disclosure provides a video signal processing device and a video signal processing method as follows.

According to an embodiment of the present disclosure, provided is a video signal processing method including: identifying a tree type of a current chroma block; deriving a chroma intra prediction mode of the current chroma block on the basis of a luma intra prediction mode of a preconfigured position; generating a prediction block of the current chroma block on the basis of the chroma intra prediction mode; and reconstructing the current chroma block by adding a residual block of the current chroma block to the prediction block, wherein, when a luma prediction mode of the preconfigured position is an intra block copy mode, the luma intra prediction mode is configured to be a preconfigured mode.

As an embodiment, the deriving of the chroma intra prediction mode may include acquiring a first syntax element in which a mode index indicates the current chroma intra prediction mode within a preconfigured mapping table according to the luma intra prediction mode.

As an embodiment, the preconfigured position may be a luma position of a bottom right center sample position of the current chroma block.

As an embodiment, the preconfigured mode may be an intra DC mode.

As an embodiment, when the tree type of the current chroma block is a dual tree, a second syntax element, which indicates whether an intra block copy mode is applied to the current chroma block, may be inferred to be a preconfigured value without being parsed.

As an embodiment, the preconfigured value may be 0, and an intra block copy mode may not be applied to the current chroma block, the tree type of which is the dual tree.

According to an embodiment of the present disclosure, provided is a video signal processing device including a processor, wherein the processor identifies a tree type of a current chroma block, derives a chroma intra prediction mode of the current chroma block on the basis of a luma intra prediction mode of a preconfigured position if the tree type of the current chroma block is a dual tree, generates a prediction block of the current chroma block on the basis of the chroma intra prediction mode, and reconstructs the current chroma block by adding a residual block of the current chroma block to the prediction block, wherein, when a luma prediction mode of the preconfigured position is an intra block copy mode, the luma intra prediction mode is configured to be a preconfigured mode.

As an embodiment, the processor may acquire a first syntax element in which a mode index indicates the current chroma intra prediction mode within a preconfigured mapping table according to the luma intra prediction mode.

As an embodiment, the preconfigured position may be a luma position of a bottom right center sample position of the current chroma block.

As an embodiment, the preconfigured mode may be an intra DC mode.

As an embodiment, when the tree type of the current chroma block is the dual tree, a second syntax element, which indicates whether an intra block copy mode is applied to the current chroma block, may be inferred to be a preconfigured value without being parsed.

As an embodiment, the preconfigured value may be 0, and an intra block copy mode may not be applied to the current chroma block, the tree type of which is the dual tree.

According to an embodiment of the present disclosure, provided is a video signal processing method including: determining a tree type of a current chroma block; determining a chroma intra prediction mode of the current chroma block on the basis of a luma intra prediction mode of a preconfigured position; generating a prediction block of the current chroma block on the basis of the chroma intra prediction mode; and deriving a residual block of the current chroma block by subtracting the prediction block from an original block, wherein, when a luma prediction mode of the preconfigured position is an intra block copy mode, the luma intra prediction mode is configured to be a preconfigured mode.

According to an embodiment of the present disclosure, provided is a non-transitory computer-readable medium (computer-executable component) in which a computer-executable component configured to be executed by one or more processors of a computing device is stored, the computer-executable component being configured to identify a tree type of a current chroma block, derive a chroma intra prediction mode of the current chroma block on the basis of a luma intra prediction mode of a preconfigured position, generate a prediction block of the current chroma block on the basis of the chroma intra prediction mode, and reconstruct the current chroma block by adding a residual block of the current chroma block to the prediction block, wherein, when a luma prediction mode of the preconfigured position is an intra block copy mode, the luma intra prediction mode is configured to be a preconfigured mode.

According to an embodiment of the present disclosure, a video signal processing method includes: acquiring a first syntax element indicating whether a current block is encoded using a most probable mode (MPM), wherein the MPM indicates a mode in which an intra prediction mode of the current block is derived from an intra predicted block around the current block; when the current block is not encoded using the MPM, acquiring a second syntax element configured to indicate the intra prediction mode of the current block from among intra prediction modes other than an MPM candidate; configuring an MPM candidate list on the basis of intra prediction modes of the left and upper neighboring blocks of the current block; deriving the intra prediction mode of the current block on the basis of the second syntax element; and generating a prediction block of the current block on the basis of the intra prediction mode, wherein the intra prediction mode of the current block is derived using a value obtained by adding 1 to the second syntax element regardless of an MPM candidate included in the MPM candidate list.

As an embodiment, the MPM candidate list may include five MPM candidates, and the MPM candidate list may not include a planar mode.

As an embodiment, the deriving of the intra prediction mode may include rearranging the MPM candidate list by swapping MPM candidates in the MPM candidate list.

As an embodiment, the deriving of the intra prediction mode may include comparing the MPM candidates in the rearranged MPM candidate list with the value obtained by adding 1 to the second syntax element.

As an embodiment, the deriving of the intra prediction mode may include adding 1 to the value obtained by adding 1 to the second syntax element, when the value obtained by adding 1 to the second syntax element is greater than or equal to the MPM candidates in the rearranged MPM candidate list.

As an embodiment, the method may include acquiring a third syntax element indicating whether the intra prediction mode of the current block is a planar mode, when the current block is encoded using the MPM.

According to an embodiment of the present disclosure, provided is a video signal processing device including a processor, wherein the processor acquires a first syntax element indicating whether a current block is encoded using a most probable mode (MPM), wherein the MPM indicates a mode in which an intra prediction mode of the current block is derived from an intra predicted block around the current block, acquires, when the current block is not encoded using the MPM, a second syntax element configured to indicate the intra prediction mode of the current block from among intra prediction modes other than an MPM candidate, configures an MPM candidate list on the basis of intra prediction modes of the left and upper neighboring blocks of the current block, derives the intra prediction mode of the current block on the basis of the second syntax element, and generates a prediction block of the current block on the basis of the intra prediction mode, wherein the intra prediction mode of the current block is derived using a value obtained by adding 1 to the second syntax element regardless of an MPM candidate included in the MPM candidate list.

As an embodiment, the MPM candidate list may include five MPM candidates, and the MPM candidate list may not include a planar mode.

As an embodiment, the processor may rearrange the MPM candidate list by swapping MPM candidates in the MPM candidate list.

As an embodiment, the processor may compare the MPM candidates in the rearranged MPM candidate list with the value obtained by adding 1 to the second syntax element.

As an embodiment, the processor may add 1 to the value obtained by adding 1 to the second syntax element, when the value obtained by adding 1 to the second syntax element is greater than or equal to the MPM candidates in the rearranged MPM candidate list.

As an embodiment, in the video signal processing device, the processor may acquire a third syntax element indicating whether the intra prediction mode of the current block is a planar mode, when the current block is encoded using the MPM.

According to an embodiment of the present disclosure, provided is a video signal processing method including: encoding a first syntax element indicating whether a current block is encoded using a most probable mode (MPM), wherein the MPM indicates a mode in which an intra prediction mode of the current block is derived from an intra predicted block around the current block; when the current block is not encoded using the MPM, encoding a second syntax element configured to indicate the intra prediction mode of the current block from among intra prediction modes other than an MPM candidate; configuring an MPM candidate list on the basis of intra prediction modes of the left and upper neighboring blocks of the current block; determining the intra prediction mode of the current block on the basis of the second syntax element; and generating a prediction block of the current block on the basis of the intra prediction mode, wherein the intra prediction mode of the current block is derived using a value obtained by adding 1 to the second syntax element regardless of an MPM candidate included in the MPM candidate list.

According to an embodiment of the present disclosure, provided is a non-transitory computer-readable medium (computer-executable component) in which a computer-executable component configured to be executed by one or more processors of a computing device is stored, the computer-executable component being configured to acquire a first syntax element indicating whether a current block is encoded using a most probable mode (MPM), wherein the MPM indicates a mode in which an intra prediction mode of the current block is derived from an intra predicted block around the current block, acquire, when the current block is not encoded using the MPM, a second syntax element configured to indicate the intra prediction mode of the current block from among intra prediction modes other than an MPM candidate, configure an MPM candidate list on the basis of intra prediction modes of the left and upper neighboring blocks of the current block, derive the intra prediction mode of the current block on the basis of the second syntax element, and generate a prediction block of the current block on the basis of the intra prediction mode, wherein the intra prediction mode of the current block is derived using a value obtained by adding 1 to the second syntax element regardless of an MPM candidate included in the MPM candidate list.

Advantageous Effects of Invention

According to an embodiment of the present disclosure, coding efficiency of a video signal can be improved.

BRIEF DESCRIPTION OF DRAWINGS

FIG. 12 is a diagram illustrating a coding unit syntax structure according to an embodiment of the present disclosure.

FIG. 13 is a diagram illustrating a coding unit syntax structure according to an embodiment of the present disclosure.

FIG. 14 is a diagram illustrating a coding unit syntax structure according to an embodiment of the present disclosure.

FIG. 15 is a diagram illustrating a method of deriving an intra prediction mode for a chroma component according to an embodiment of the present disclosure.

FIG. 16 is a diagram illustrating a method of deriving an intra prediction mode of a chroma component according to an embodiment of the present disclosure.

FIG. 17 is a diagram illustrating an intra prediction mode deriving method according to an embodiment of the present disclosure.

FIG. 18 is a diagram illustrating an MPM list configuration method according to an embodiment of the present disclosure.

FIG. 19 is a diagram illustrating deriving of an intra prediction mode according to an embodiment of the present disclosure.

FIG. 20 is a diagram illustrating an MPM list configuration method according to an embodiment of the present disclosure.

FIG. 21 is a flowchart illustrating a video signal processing method according to an embodiment of the present disclosure.

FIG. 22 is a diagram illustrating an intra prediction mode deriving method according to an embodiment of the present disclosure.

BEST MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
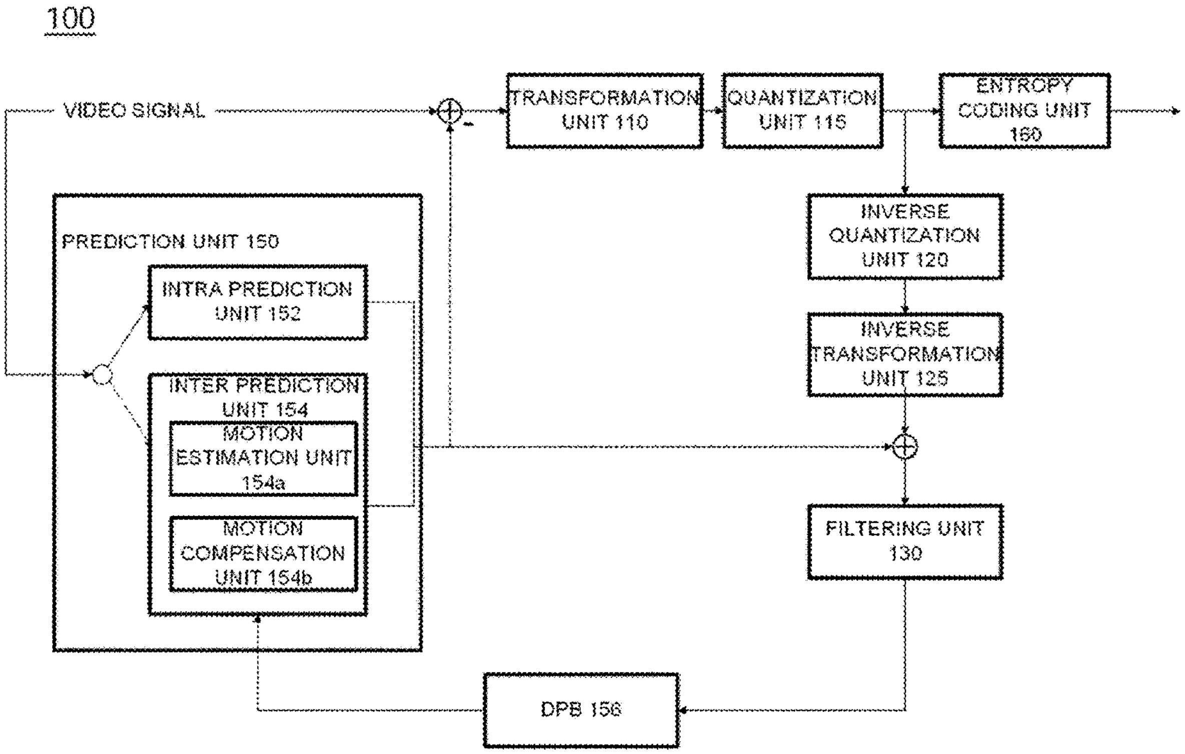
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to improve coding efficiency, a picture signal is not coded as it is, but a method of predicting a picture via the prediction unit 150 by using a region that has been already coded, and adding, to the predicted picture, a residual value between an original picture and the predicted picture, thereby obtaining a reconstructed picture. The intra prediction unit 152 performs intra prediction within a current picture, and the inter prediction unit 154 predicts the current picture by using a reference picture stored in the decoding picture buffer 156. The intra prediction unit 152 performs intra prediction from reconstructed regions in the current picture, and transfers intra coding information to the entropy coding unit 160. The inter prediction unit 154 may include a motion estimation unit 154*a* and a motion compensation unit 154*b*. The motion estimation unit 154*a* obtains a motion vector value of the current region by referring to a specific reconstructed region. The motion estimation unit 154*a* transfers location information (reference frame, motion vector, etc.) of the reference region to the entropy coding unit 160 so as to enable the location information to be included in a bitstream. The motion compensation unit 154*b* performs inter motion compensation by using the motion vector value transferred from the motion estimation unit 154*a*.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The intra encoding information may include information on a reference sample. The inter prediction unit 154 may include the motion estimation unit 154*a* and the motion compensation unit 154*b*. The motion estimation unit 154*a* obtains a motion vector value of the current region by referring to a specific region of the reconstructed reference picture. The motion estimation unit 154*a* transfers a motion information set (reference picture index, motion vector information, etc.) for the reference region to the entropy coding unit 160. The motion compensation unit 154*b* performs motion compensation by using the motion vector value transferred from the motion estimation unit 154*a*. The inter prediction unit 154 transfers inter encoding information including motion information on the reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
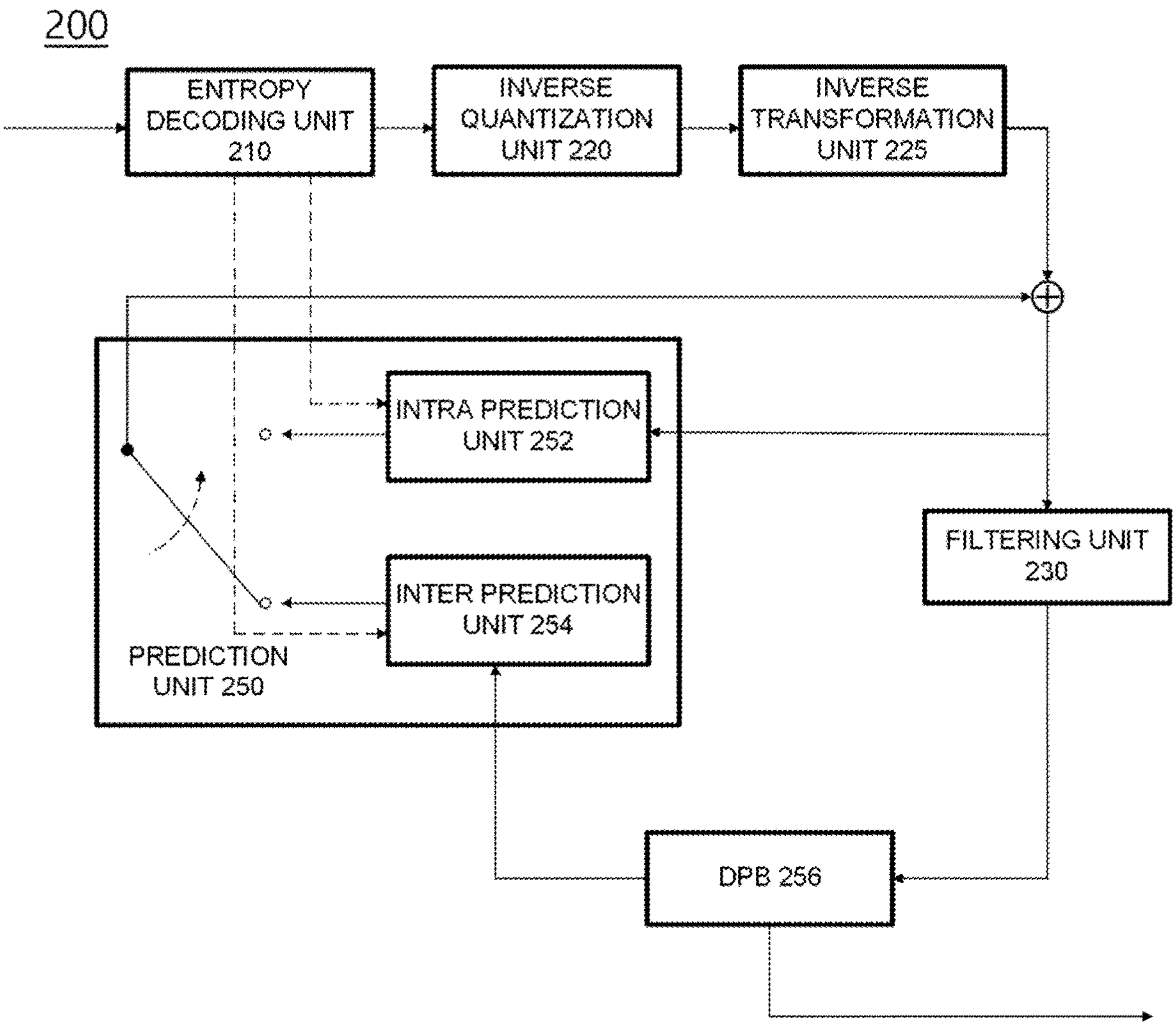
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 restores a residual value by using the inverse-quantized transform coefficient. The video signal processing device 200 restores an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that can perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may reconstruct the current region by referring to a specific region including reconstructed samples in the current picture. The intra BC prediction unit obtains intra BC encoding information for the current region from the entropy decoding unit 210. The intra BC prediction unit obtains a block vector value of the current region indicating the specific region in the current picture. The intra BC prediction unit may perform intra BC prediction by using the obtained block vector value. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
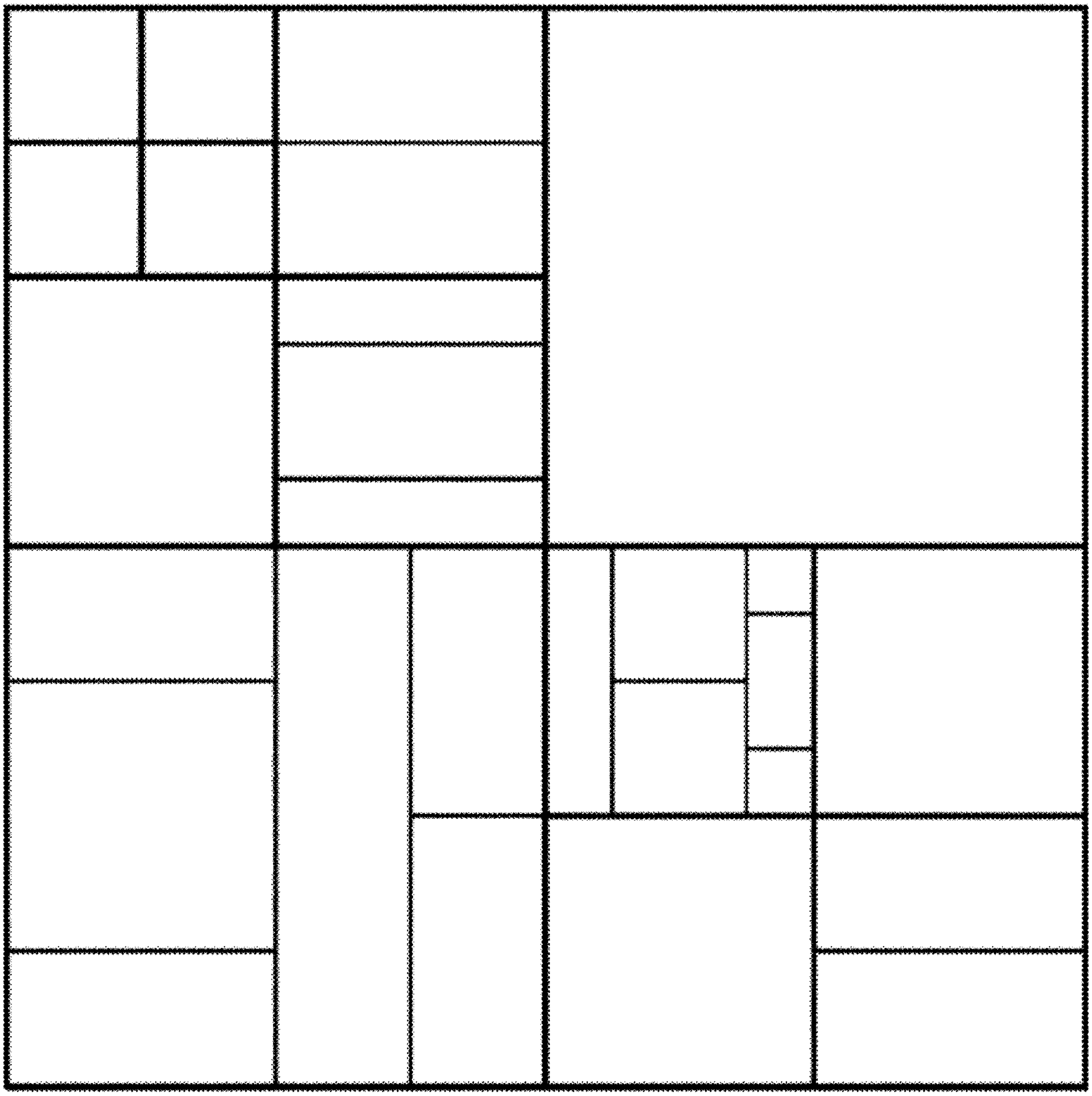
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

The leaf node of the multi-type tree can be a coding unit. If splitting for the coding unit is not indicated or the coding unit is not large for the maximum transform length, the coding unit is used as a unit of prediction and transform without further division. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
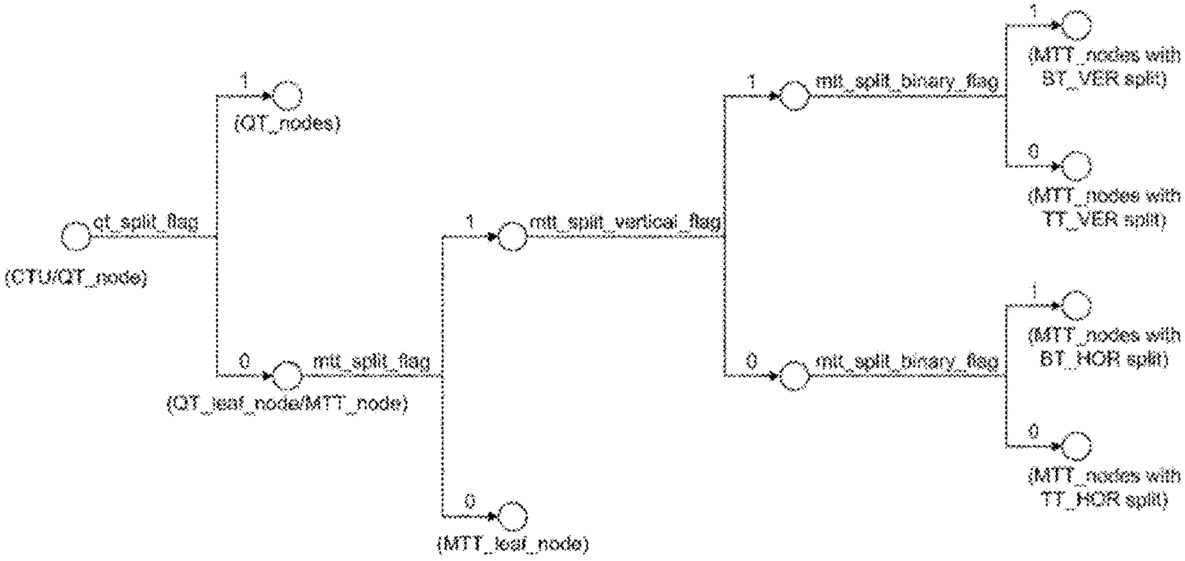
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and can be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
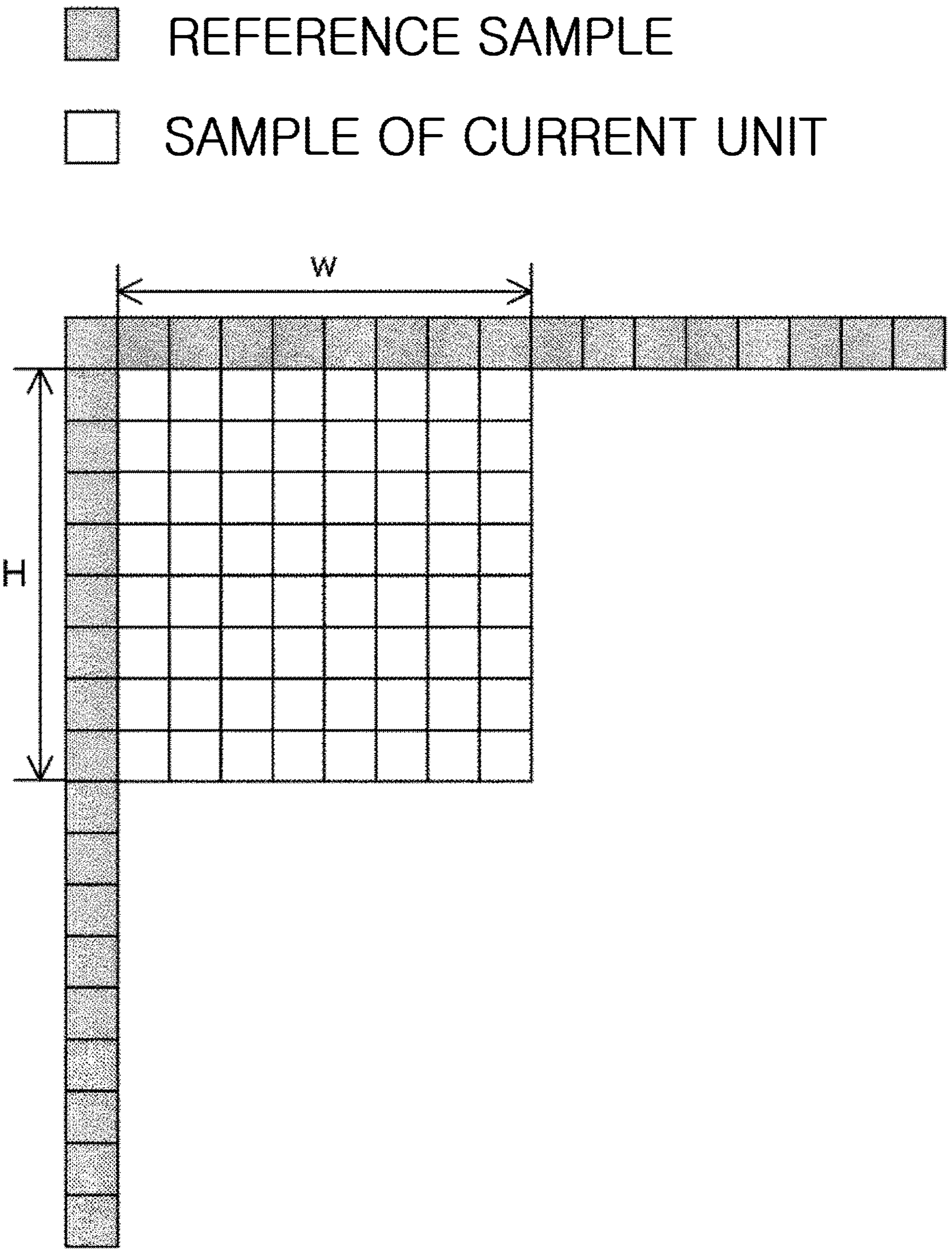
FIGS. 5 and 6 illustrate an intra-prediction method in more detail according to an embodiment of the present disclosure.
Figure 6:
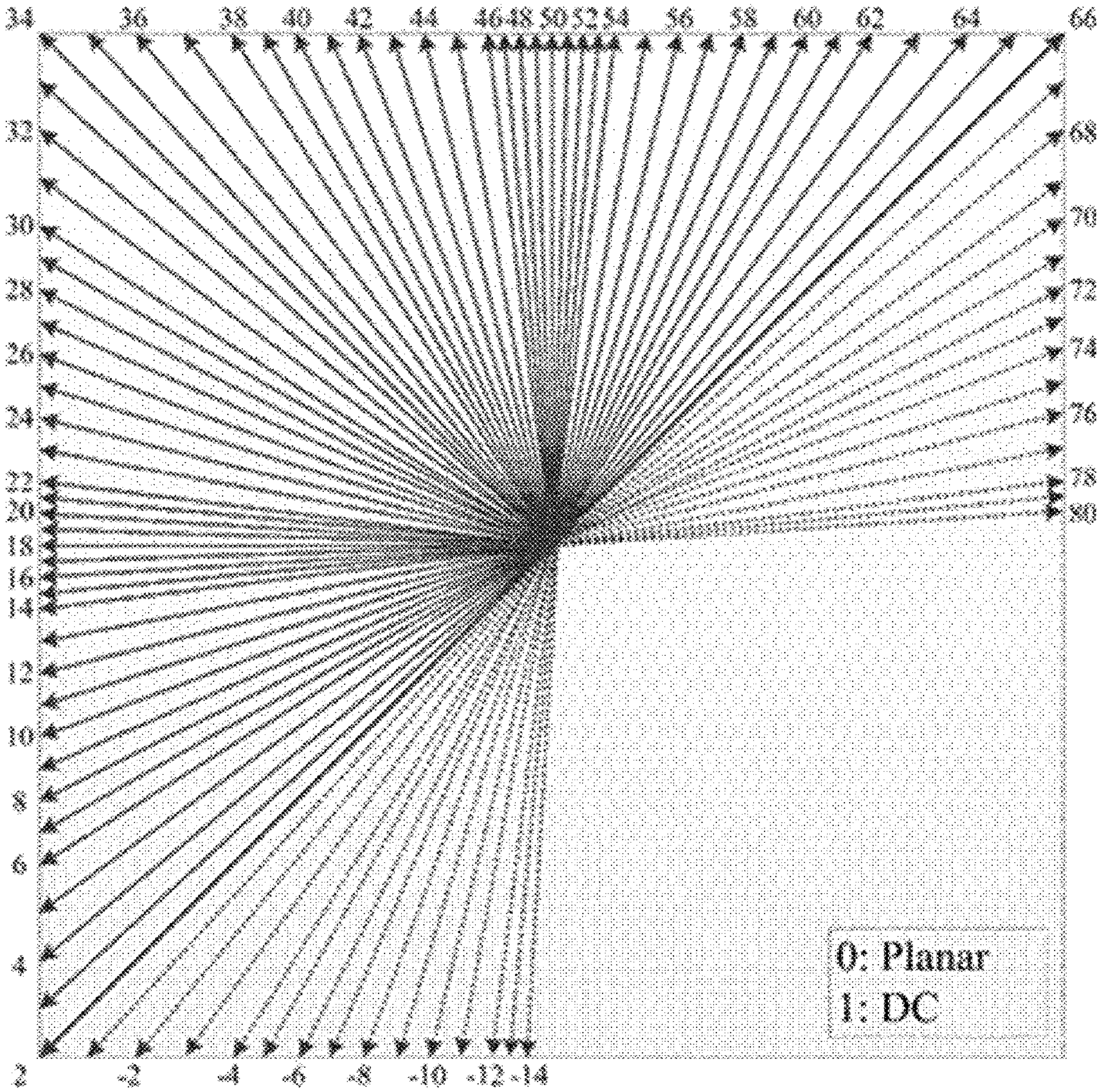

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2W+2H+1 neighboring samples located on the left and/or upper side of the current block.

When at least some samples to be used as reference samples have not yet been restored, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

In an additional embodiment of the present disclosure, an angular mode out of a first angular range may additionally be used. As an embodiment, the angular mode out of the first angular range may be the angular mode of −14 to −1 or 67 to 80 of FIG. 6. As described above, the number of extended angle modes may vary depending on the size and/or shape of the current block, and may be extended up to the angle mode of 80 or −14 of FIG. 6. For example, the number of extended angles or an index of an extended mode may be determined according to a value based on a ratio of a width and a height of the current block. In an embodiment, the value based on the ratio of the width and height of the current block may be Abs(Log 2(width/height)). The current block may be a transform block. Alternatively, the current block may be a CU or a PU.

Hereinafter, an inter prediction method according to an embodiment of the present disclosure is described with reference to FIG. 7. In the present disclosure, the inter prediction method may include a general inter prediction method optimized for translation motion and an inter prediction method based on an affine model. Further, the motion vector may include at least one of a general motion vector for motion compensation according to the general inter prediction method and a control point motion vector for affine compensation.

Figure 7:
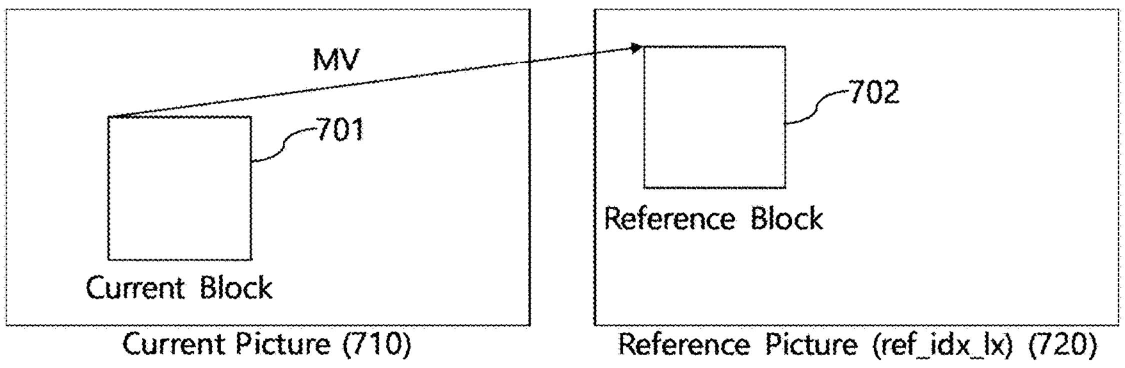
FIG. 7 illustrates an inter prediction method according to an embodiment of the present disclosure.

FIG. 7 illustrates an inter prediction method according to an embodiment of the present disclosure. As described above, the decoder may predict the current block with reference to reconstructed samples of another decoded picture. Referring to FIG. 7, the decoder acquires a reference block 702 within a reference picture 720 on the basis of a motion information set of a current block 701. In this case, the motion information set may include a reference picture index and a motion vector (MV). The reference picture index indicates a reference picture 720 including a reference block for inter prediction of the current block in a reference picture list. According to an embodiment, the reference picture list may include at least one of the L0 picture list or the L1 picture list. The motion vector indicates an offset between a coordinate value of the current block 701 within the current picture 710 and a coordinate value of the reference block 702 within the reference picture 720. The decoder acquires a predictor of the current block 701 on the basis of sample values of the reference block 702 and reconstructs the current block 701 using the predictor.

Specifically, the encoder may acquire the reference block by searching for blocks similar to the current block in pictures having a higher restoration sequence. For example, the encoder may search for a reference block having a minimum sum of differences in sample values from the current block within a preset search area. In this case, in order to measure similarity between the current block and samples of the reference block, at least one of Sum of Absolute Difference (SAD) and Sum of Hadamard Transformed Difference (SATD) may be used. Here, the SAD may be a value obtained by adding all of absolute values of differences in sample values included in two blocks. Further, the SATD may be a value obtained by adding all of absolute values of Hadamard transform coefficients acquired through Hadamard transform of differences in sample values included in two blocks.

Meanwhile, the current block may be predicted using one or more reference areas. As described above, the current block may be inter-predicted through a pair prediction method using two or more reference areas. According to an embodiment, the decoder may acquire two reference blocks on the basis of two motion information sets of the current block. Further, the decoder may acquire a first predictor and a second predictor of the current block on the basis of sample values of the two acquired reference blocks. In addition, the decoder may reconstruct the current block using the first predictor and the second predictor. For example, the decoder may reconstruct the current block on the basis of an average for each of the samples of the first predictor and the second predictor.

As described above, for motion compensation of the current block, one or more motion information sets may be signaled. In this case, similarity between motion information sets for motion compensation of each of a plurality of blocks may be used. For example, the motion information set used for predicting the current block may be induced from motion information sets used for predicting one of other reconstructed samples. To this end, the encoder and the decoder may reduce signaling overhead.

For example, there may be a plurality of candidate blocks that are likely to have been predicted on the basis of a motion information set which is the same as or similar to the motion information set of the current block. The decoder may generate a merge candidate list on the basis of the plurality of candidate blocks. Here, the merge candidate list may include candidates corresponding to samples that are likely to have been predicted on the basis of a motion information set related to the motion information set of the current block, among samples reconstructed earlier than the current block. The encoder and the decoder may configure the merge candidate list of the current block according to a predefined rule. Here, the merge candidate lists respectively configured by the encoder and the decoder may be the same. For example, the encoder and the decoder may configure the merge candidate list of the current block on the basis of a location of the current block in a current picture. In the present disclosure, the position of a particular block indicates a relative position of a top-left sample of the particular block in a picture including the particular block.

Meanwhile, in order to improve coding efficiency, a method of quantizing a transform coefficient value obtained by transforming a residual signal and the quantized transform coefficient may be used instead of coding the above-described residual as it is. As described above, the transform unit may obtain a transform coefficient value by transforming a residual signal. In this case, the residual signal of a specific block may be distributed over an entire area of the current block. Accordingly, it is possible to improve coding efficiency by concentrating energy in the low frequency region through frequency domain conversion of a residual signal. Hereinafter, a method of transforming or inversely transforming a residual signal will be described in detail.

Figure 8:
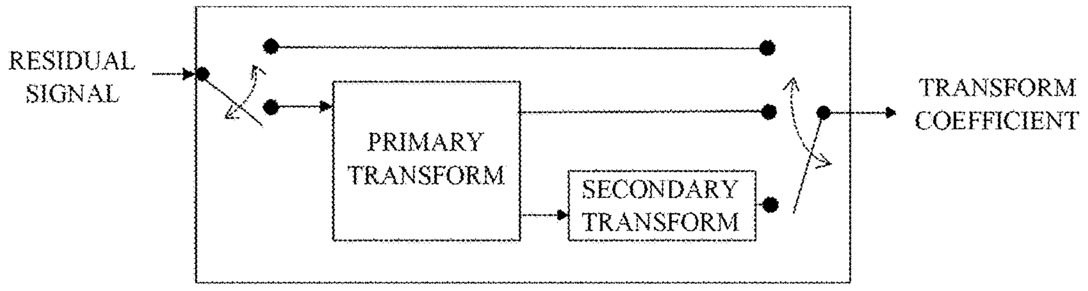
FIG. 8 is a diagram specifically illustrating a method for transforming a residual signal by an encoder.

FIG. 8 is a diagram specifically illustrating a method for transforming a residual signal by an encoder. As described above, a residual signal in a spatial domain may be transformed to a frequency domain. An encoder may obtain a transform coefficient by transforming the obtained residual signal. First, the encoder may obtain at least one residual block including a residual signal for a current block. The residual block may be either the current block or one of blocks divided from the current block. In the present disclosure, the residual block may be referred to as a residual array or a residual matrix which include residual samples of the current block. In the present disclosure, the residual block may represent a transform unit or a block having the same size as that of the transform block.

Next, the encoder may transform the residual block by using a transform kernel. The transform kernel used for transformation of the residual block may be a transform kernel having separable characteristics of vertical transform and horizontal transform. In this case, the transform for the residual block may be performed separately into vertical transform and horizontal transform. For example, the encoder may perform vertical transformation by applying a transform kernel in the vertical direction of the residual block. The encoder may perform horizontal transform by applying the transform kernel in the horizontal direction of the residual block. In the present disclosure, the transform kernel may be used as a term to refer to a parameter set used for transform of the residual signal, such as transform matrix, transform array, transform function, and transform. According to an embodiment, the transform kernel may be any one of a plurality of available kernels. A transform kernel based on different transform types may be used for each of the vertical transform and the horizontal transform.

The encoder may transfer the transform block transformed from the residual block to a quantization unit and quantize the transform block. The transform block may include a plurality of transform coefficients. Specifically, the transform block may include the plurality of transform coefficients arranged in two dimensions. As in the case of the residual block, the size of the transform block may be the same as the size of either the current block or the block divided from the current block. The transform coefficients transferred to the quantization unit may be expressed as quantized values.

The encoder may perform additional transform before the transform coefficients are quantized. As illustrated in FIG. 8, the above-described transform method may be referred to as a primary transform, and an additional transform may be referred to as a secondary transform. The secondary transform may be selective for each residual block. According to an embodiment, the encoder may improve coding efficiency by performing secondary transform for a region where it is difficult to concentrate energy in a low-frequency region only by primary transform. For example, secondary transform may be added to a block in which residual values appear larger in a direction other than the horizontal or vertical direction of the residual block. The residual values of an intra-predicted block may have a higher probability of transformation in a direction other than the horizontal or vertical direction compared to the residual values of an inter-predicted block. Accordingly, the encoder may additionally perform secondary transform on the residual signal of the intra-predicted block. The encoder may omit secondary transform for the residual signal of the inter-predicted block.

As another example, whether to perform a secondary transform may be determined according to the size of a current block or a residual block. In addition, transform kernels with different sizes may be used according to the size of a current block or a residual block. For example, an 8×8 secondary transform may be applied to a block in which the length of a shorter side among the width or the height is equal to or larger than a first pre-configured length. In addition, a 4×4 secondary transform may be applied to a block in which the length of a shorter side among the width or the height is equal to or larger than a second pre-configured length and is smaller than the first pre-configured length. The first pre-configured length may be larger than the second pre-configured length, but the present disclosure is not limited thereto. In addition, a secondary transform may not be divided into a vertical transform and a horizontal transform unlike a primary transform. Such a secondary transform may be called a low frequency non-separable transform (LFNST).

In the case of a video signal in a specific region, energy in a high frequency band may not be reduced even if frequency transformation is performed due to a sudden change in brightness. Accordingly, compression performance due to quantization may be deteriorated. When transform is performed on a region in which a residual value rarely exists, an encoding time and a decoding time may be unnecessarily increased. Accordingly, transform on the residual signal of the specific region may be omitted. Whether to perform transform on the residual signal of the specific region may be determined by a syntax element related to transform of the specific region. For example, the syntax element may include transform skip information. The transform skip information may be a transform skip flag. If the transform skip information on the residual block indicates a transform skip, transform on the residual block is not performed. In this case, the encoder may immediately quantize the residual signal on which transform of a corresponding region has not been performed. The operations of the encoder described with reference to FIG. 8 may be performed via the transform unit of FIG. 1.

The above-described transform-related syntax elements may be information parsed from a video signal bitstream. The decoder may entropy-decode the video signal bitstream so as to obtain transform-related syntax elements. The encoder may entropy-code the transform-related syntax elements so as to generate a video signal bitstream.

Figure 9:
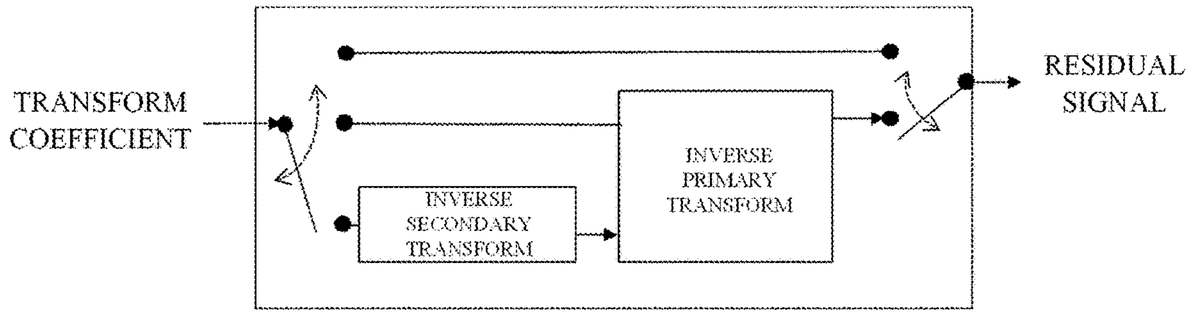
FIG. 9 is a diagram specifically illustrating a method for obtaining a residual signal by inverse transforming a transform coefficient by an encoder and a decoder.

FIG. 9 is a diagram specifically illustrating a method for obtaining a residual signal by inverse transforming a transformation coefficient by an encoder and a decoder. For the convenience of description, it will be described that an inverse transform operation is performed via an inverse transform unit of each of an encoder and a decoder. The inverse transform unit may obtain a residual signal by inverse transforming an inverse quantized transform coefficient. First, the inverse transform unit may detect whether inverse transform for a specific region is performed, from a transform-related syntax element of the region. According to an embodiment, when a transform-related syntax element for a specific transform block indicates a transform skip, transform on the transform block may be omitted. In this case, both the primary inverse transform and the secondary inverse transform described above regarding the transform block may be omitted. The inverse quantized transform coefficient may be used as a residual signal. For example, the decoder may reconstruct a current block by using the inverse quantized transform coefficient as a residual signal.

According to another embodiment, the transform-related syntax element for the specific transform block may not indicate a transform skip. In this case, the inverse transform unit may determine whether to perform secondary inverse transform for secondary transform. For example, when the transform block is a transform block of an intra-predicted block, secondary inverse transform may be performed on the transform block. A secondary transform kernel used for the transform block may be determined based on an intra prediction mode corresponding to the transform block. As another example, whether to perform secondary inverse transform may be determined based on the size of the transform block. Secondary inverse transform may be performed after inverse quantization and before primary inverse transform.

The inverse transform unit may perform primary inverse transform on the inverse quantized transform coefficient or a secondary inverse transformed transform coefficient. In the case of primary inverse transform, vertical transform and horizontal transform may be performed separately as in the case of primary transform. For example, the inverse transform unit may obtain a residual block by performing vertical inverse transform and horizontal inverse transform on the transform block. The inverse transform unit may inverse transform the transform block on the basis of the transform kernel used for transforming the transform block. For example, the encoder may explicitly or implicitly signal information indicating the transform kernel applied to the current transform block from among a plurality of available transform kernels. The decoder may select a transform kernel to be used for inverse transform of the transform block from among the plurality of available transform kernels by using information indicating the signaled transform kernel. The inverse transform unit may reconstruct the current block by using the residual signal obtained via inverse transform on the transform coefficient.

Figure 10:
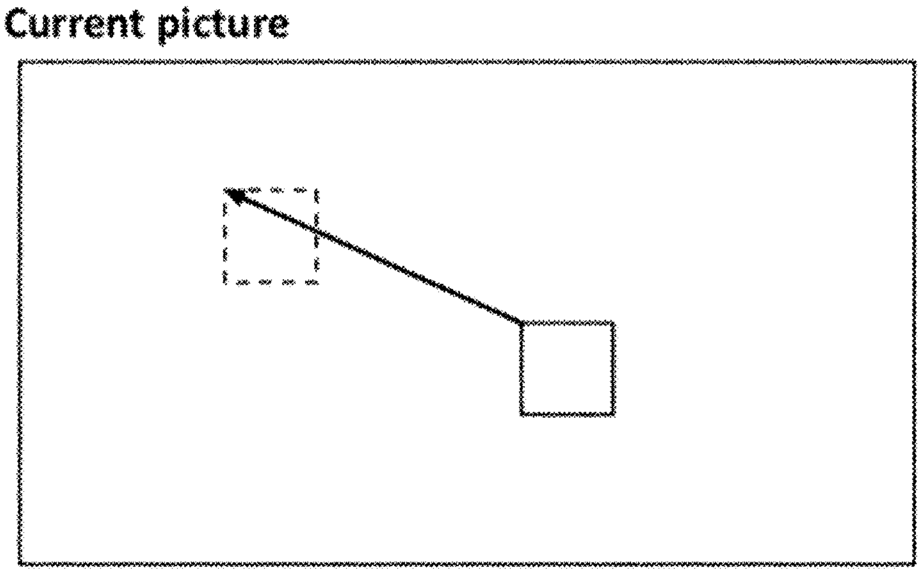
FIG. 10 is a diagram for describing a current picture referencing method according to an embodiment of the present disclosure.

FIG. 10 is a diagram for describing a current picture referencing method according to an embodiment of the present disclosure. As described above, when performing prediction on a current block, an encoder/decoder may refer to a block (i.e., reference block within a reference picture) within a reference picture. According to an embodiment of the present disclosure, the reference picture may be a picture including the current block, i.e., a current picture. That is, when performing prediction on the current block, the encoder/decoder may refer to a block within the current picture. In the present disclosure, such a method of performing prediction by referring to the block within the current picture may be referred to as current picture referencing (CPR) or intra block copy (IBC). In an embodiment, when IBC is used, that is, when CPR is applied to the current block, the current picture may be the only reference picture for IBC prediction. In this case, the encoder/decoder may perform inferring without performing signaling/parsing for indication of a reference picture.

According to an embodiment, when IBC is applied, there may be a motion vector indicating a reference block referenced by the current block. According to an embodiment, when IBC is applied, a position of the reference block may be limited. For example, the position of the reference block may be limited to an area within a certain range based on a current block position. For example, the position of the reference block may be limited to an area within a coding tree unit (CTU) (i.e., current CTU) including the current block. Alternatively, the position of the reference block may be limited to a position including at least a part of the CTU including the current block. According to an embodiment of the present disclosure, a memory burden may be reduced and compression efficiency may be improved by limiting the position of the reference block.

According to an embodiment of the present disclosure, a signaling (or syntax element) indicating whether the current block uses IBC (or whether IBC is applied to the current block) may exist. As an embodiment, the signaling may be a signaling in a larger unit (or higher level) including the current block. For example, a syntax element indicating whether the current block uses IBC may be signaled at a slice or tile level. As an embodiment, when the reference picture referred to by the current block is the current picture, IBC may be used. Alternatively, if the current picture is the only reference picture, the encoder/decoder may use IBC. Additionally, if the current block is a block that does not use intra prediction, IBC may be used. That is, for example, when the reference picture corresponding to the current block is the current picture, if intra prediction is not used, IBC may be used. As an embodiment, a variable indicating whether the current picture is the only reference picture may be defined, and for example, a variable indicating that the current picture is the only reference picture may be expressed as CurrPicIsOnlyRef. Alternatively, using IBC may indicate that the reference picture is the current picture. Alternatively, using IBC may indicate that the reference picture is the current picture and does not use intra prediction.

According to an embodiment of the present disclosure, when IBC is used (or applied), the encoder/decoder may indicate (or signal) motion information by using the aforementioned merge mode, an AMVP mode, etc. When IBC is used, a current slice or tile may be configured (or defined) as a P slice or a P tile. When IBC is used, a flag (or syntax element or variable) indicating use of a dual tree may be configured to be a value indicating use of a dual tree. In the present disclosure, the dual tree may refer to a tree structure in which a tree corresponding to a luma component and a tree corresponding to a chroma component may be different.

Referring to FIG. 10, there may be the current block represented by a solid line in the current picture, and the reference block represented by a dotted line may exist in the current picture. In this case, motion information indicating a reference block position may exist. Referring to FIG. 10, an arrow may represent motion information indicating the reference block position. According to an embodiment of the present disclosure, when IBC is used, a candidate list configuration may be different. For example, when IBC is used, a temporal candidate may not be included in a candidate list. In an embodiment, when IBC is used, motion information referenced in the vicinity may not be scaled.

Figure 11:
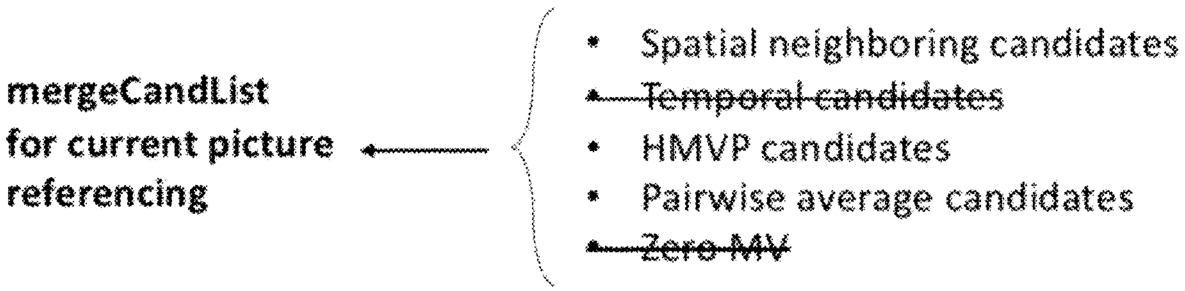
FIG. 11 is a diagram illustrating a method of configuring a merge candidate list according to an embodiment of the present disclosure.

FIG. 11 is a diagram illustrating a method of configuring a merge candidate list according to an embodiment of the present disclosure. According to an embodiment, a merge candidate list configuration method when IBC is used may be different from that when IBC is not used. For example, a part of candidates, which may be added to a merge candidate list when IBC is not used, may be unable to be added to the merge candidate list when IBC is used. As an embodiment, when IBC is used, a zero motion vector (MV) may not be used. This is because a reference block indicated by the zero MV in a current picture may be a current block. As an embodiment, when IBC is used, a temporal motion vector (i.e., collocated MV) may not be used. This is because when IBC is used, a picture other than the current picture may not be referred to.

As an embodiment, when IBC is used, an HMVP candidate or a pairwise average candidate may not be used. As an embodiment, when IBC is used, a candidate based on the HMVP candidate or pair average candidate may be used. As an embodiment, when IBC is used, a sub-block merge mode may not be used. When IBC is used, a decoder may perform inferring without parsing a flag indicating whether the sub-block merge mode is applied.

FIG. 12 is a diagram illustrating a coding unit syntax structure according to an embodiment of the present disclosure. According to an embodiment of the present disclosure, IBC may exist (or be defined) as an independent prediction mode. That is, the intra prediction and inter prediction described above may be expressed as MODE_INTRA and MODE_INTER, respectively, and MODE_IBC differing from MODE_INTRA and MODE_INTER may be defined. As shown in the preceding drawings, MODE_INTRA, MODE_INTER, and MODE_IBC may be represented by a CuPredMode value. Here, CuPredMode is a variable indicating a current prediction mode.

Referring to FIG. 12, a tile group may be a higher level processing unit than a CU, a CTU, or a PU. A tile group according to an embodiment of the present disclosure may be a unit capable of parallel processing. In the present disclosure, the tile group may be replaced by a slice or a different unit capable of parallel processing. A bi-predictive (B) tile group may use intra prediction, inter prediction, IBC, or the like. The B tile group may use up to two motion vectors and up to two reference indices in a block. The B tile group may use one or more motion vectors and one or more reference indices in a block.

In an embodiment, intra prediction may include IBC prediction. Intra prediction may be a prediction method in which only a current picture is referred to. Inter prediction may be a prediction method in which a picture other than a current picture is referred to as a reference picture. A predictive (P) tile group may use intra prediction, inter prediction, IBC prediction, or the like. The P tile group may use up to one motion vector and up to one reference index in a block. The B tile group may not use two or more motion vectors and two or more reference indices in a block.

An intra (I) tile group indicates a tile group (slice) which may use intra prediction and IBC prediction. The I tile group may not refer to a picture other than a current picture, as a reference picture.

According to an embodiment of the present disclosure, in S1201, if (tile_group_type!=I||sps_ibc_enabled_flag), there may be a possibility of parsing cu_skip_flag, pred_mode_flag, and pred_mode_ibc_flag. That is, if (tile_group_type!=I||sps_ibc_enabled_flag) is not satisfied, a decoder may not parse all of cu_skip_flag, pred_mode_flag, and pred_mode_ibc_flag. Here, sps_ibc_enabled_flag may be a higher level signaling (or syntax element) indicating whether IBC may be used. If sps_ibc_enabled_flag is configured to 0, IBC may not be used, and if sps_ibc_enabled_flag is configured to 1, IBC may be used. Further, cu_skip_flag represents a syntax element indicating whether a skip mode is used. If cu_skip_flag is 1, the skip mode may be used. A prediction mode may be determined based on pred_mode_flag or pred_mode_ibc_flag. That is, whether a current mode is MODE_INTRA, MODE_INTER, or MODE_IBC may be determined based on pred_mode_flag or pred_mode_ibc_flag. Alternatively, a CuPredMode value may be determined based on pred_mode_flag or pred_mode_ibc_flag.

In addition, tile_group_type may indicate a tile group type. As described above, the tile group type may include an I tile group, a P tile group, and a B tile group. Further, tile_group_type values of I, P, and B may indicate an I tile group, a P tile group, and a B tile group, respectively. As described above, in the present disclosure, the tile group may be referred to as a slice or a different unit capable of parallel processing.

According to an embodiment of the present disclosure, in S1203, if (cu_skip_flag[x0][y0]==0 && tile_group_type!=I)), the decoder may parse pred_mode_flag. If cu_skip_flag is 1, the decoder may not parse pred_mode_flag. If tile_group_type is I, the decoder may not parse pred_mode_flag.

According to an embodiment of the present disclosure, in S1204, if ((tile_group_type==I && cu_skip_flag[x0][y0]==0)||(tile_group_type!=I && (cu_skip_flag[x0][y0]||CuPredMode[x0][y0]!=MODE_INTRA)) && sps_ibc_enabled_flag && blockSizeCondition), the decoder may parse pred_mode_ibc_flag. For example, if (tile_group_type==I && cu_skip_flag[x0][y0]==0), the decoder may parse pred_mode_ibc_flag. Alternatively, if (tile_group_type!=I && (cu_skip_flag[x0][y0]||CuPredMode[x0][y0]!=MODE_INTRA)), the decoder may parse pred_mode_ibc_flag. Alternatively, if neither (tile_group_type==I && cu_skip_flag [x0][y0]==0) nor (tile_group_type!=I && (cu_skip_flag [x0][y0]||CuPredMode[x0][y0]!=MODE_INTRA)), the decoder may not parse pred_mode_ibc_flag. If sps_ibc_enabled_flag is 1, the decoder may parse pred_mode_ibc_flag, and if sps_ibc_enabled_flag is 0, the decoder may not parse pred_mode_ibc_flag. A condition based on a block size capable of parsing pred_mode_ibc_flag may be predefined. Referring to FIG. 12, as an example, the block size condition may be defined (or configured) to be a case where both cbWidth and cbHeight have a value smaller than 32. Here, cbWidth is a variable indicating a width of the current block (i.e., coding unit or coding block), and cbHeight is a variable indicating a height of the current block.

As an embodiment, in S1205, if CuPredMode is MODE_INTRA, the decoder may parse syntax elements related to intra prediction. If CuPredMode is MODE_INTRA, the decoder may not parse syntax elements related to a motion vector. If CuPredMode is not MODE_INTRA, the decoder may parse an inter prediction-related syntax element. If CuPredMode is not MODE_INTRA, an IBC-related syntax element may be parsed. The IBC-related syntax element may include a motion vector-related syntax element. That is, if CuPredMode is MODE_IBC, the IBC-related syntax element may be parsed. The IBC-related syntax element may include a merge mode-related syntax element and an AMVP-related syntax element. In IBC, a prediction mode may be more restrictive than a case of MODE_INTER, and the number of syntax elements to be parsed may be less than the case of MODE_INTER. For example, in the case of MODE_IBC, the decoder may parse only a syntax element for reference list L0. As another example, in the case of MODE_IBC, the decoder may not parse a part of flags indicating whether the mode is used in a merge_data syntax structure. If CuPredMode is not MODE_INTRA, the decoder may parse the inter prediction-related syntax element or may parse the IBC-related syntax element. If the IBC-related syntax element is parsed, the decoder may not parse a syntax element for a chroma component. Alternatively, if CuPredMode is not MODE_INTRA, the decoder may parse the inter prediction-related syntax element, and parsing of the IBC-related syntax element may be a case where treeType is not DUAL_TREE_CHROMA. DUAL_TREE_CHROMA indicates that a tree type is a dual tree of a chroma component.

Here, treeType is a variable indicating a tree type of the current block (i.e., coding unit or coding block). In other words, treeType is a variable indicating a tree type used when the current block, which is a current coding tree node, is partitioned. The tree type may include a dual tree or a single tree. In a case of a dual tree, treeType may indicate a dual tree of a luma component or a dual tree of a chroma component.

As an embodiment of the present disclosure, the encoder/decoder may determine (decide), based on treeType, a component (e.g., luma component (block) or chroma component (block)) to be syntax-parsed or a component to be processed. If treeType is SINGLE_TREE, a luma component and a chroma component may share a syntax element value. If treeType is SINGLE_TREE, a luma block and a chroma block may be partitioned in the same way (or in the same structure). If treeType is DUAL_TREE, a luma block and a chroma block may be partitioned in different ways. Further, treeType of DUAL_TREE may include DUAL_TREE_LUMA and DUAL_TREE_CHROMA. Depending on whether treeType is DUAL_TREE_LUMA or DUAL_TREE_CHROMA, the decoder may determine (or decide) whether to process a luma component or a chroma component.

According to an embodiment of the present disclosure, a prediction mode of the current coding unit may be determined based on pred_mode_flag. CuPredMode may be determined based on pred_mode_flag. Whether the prediction mode corresponds to inter prediction or intra prediction may be indicated based on pred_mode_flag. According to an embodiment of the present disclosure, if pred_mode_flag is 0, CuPredMode may be configured to MODE_INTER. If pred_mode_flag is 1, CuPredMode may be configured to MODE_INTRA. According to an embodiment, pred_mode_flag may indicate whether the current CU is in an inter prediction mode or an intra prediction mode.

If pred_mode_flag does not exist, the decoder may infer pred_mode_flag or CuPredMode. If pred_mode_flag does not exist, pred_mode_flag or CuPredMode may be inferred based on a type of a tile group (or slice). For example, in a case of an I tile group, the decoder may infer CuPredMode to be MODE_INTRA. In a case of a P tile group or B tile group, the decoder may infer CuPredMode to be MODE_INTER.

According to an embodiment of the present disclosure, the prediction mode of the current coding unit may be determined based on pred_mode_ibc_flag. CuPredMode may be determined based on pred_mode_ibc_flag. The encoder/decoder may indicate whether the prediction mode is an IBC mode, based on pred_mode_ibc_flag.

In an embodiment, if pred_mode_ibc_flag is 0, CuPredMode may be configured to MODE_INTER. If pred_mode_ibc_flag is 1, CuPredMode may be configured to MODE_IBC. If pred_mode_ibc_flag is 0, CuPredMode may be configured to a value other than MODE_IBC.

If pred_mode_ibc_flag does not exist, the decoder may infer pred_mode_ibc_flag or CuPredMode. If pred_mode_ibc_flag does not exist, the decoder may infer pred_mode_flag or CuPredMode on the basis of the type of the tile group (or slice). For example, in the case of the I tile group, CuPredMode may be inferred to be MODE_INTRA. In the case of the P tile group or B tile group, CuPredMode may be inferred to be MODE_INTER.

According to an embodiment of the present disclosure, when using IBC, the encoder/decoder may use the skip mode. For example, when using IBC for the I tile group (or slice), the encoder/decoder may use the skip mode. For example, with respect to the I tile group, the encoder/decoder may use the skip mode for a CU using IBC. For example, a case of the IBC mode and the skip mode in the I tile group may be assumed. In this case, sps_ibc_enabled_flag may be 1. The decoder may parse cu_skip_flag. Here, a value of cu_skip_flag may be 1 (value indicating that the skip mode is used). If cu_skip_flag is 1, or in the case of the I tile group, the decoder may not parse pred_mode_flag. In this case, with respect to the I tile group, the decoder may infer CuPredMode to be MODE_INTRA. In the case of the I tile group, and if cu_skip_flag is 1, pred_mode_ibc_flag may not be parsed. In this case, the decoder may infer CuPredMode to be MODE_INTRA with respect to the I tile group. Accordingly, a situation in which CuPredMode may not be expressed as MODE_IBC despite using IBC may occur.

FIG. 13 is a diagram illustrating a coding unit syntax structure according to an embodiment of the present disclosure. According to an embodiment of the present disclosure, an encoder/decoder may not use an IBC mode for a chroma component. Specifically, if the tree type is DUAL_TREE_CHROMA, the encoder/decoder may not use the IBC mode. Referring to FIG. 13, in S1301, if treeType is not DUAL_TREE_CHROMA, the decoder may parse pred_mode_ibc_flag. If treeType is DUAL_TREE_CHROMA, the decoder may not parse pred_mode_ibc_flag. According to an embodiment, if treeType is DUAL_TREE_CHROMA, the decoder may infer CuPredMode to be MODE_INTRA.

FIG. 14 is a diagram illustrating a coding unit syntax structure according to an embodiment of the present disclosure. The coding unit syntax illustrated in FIG. 14 exemplifies syntax related to intra prediction. According to an embodiment of the present disclosure, an intra_chroma_pred_mode signaling may exist. Here, intra_chroma_pred_mode represents a syntax element indicating an intra prediction mode of a chroma component. As described below, intra_chroma_pred_mode may be an index indicating a specific prediction mode combination within an intra prediction mode table according to an intra prediction mode of a luma component, and in the present disclosure, the intra_chroma_pred_mode may be referred to as a chroma intra prediction mode index.

Referring to FIG. 14, in S1401, if treeType is SINGLE_TREE or DUAL_TREE_CHROMA, the decoder may parse intra_chroma_pred_mode. If treeType is DUAL_TREE_LUMA, the decoder may not parse intra_chroma_pred_mode.

FIG. 15 is a diagram illustrating a method of deriving an intra prediction mode for a chroma component according to an embodiment of the present disclosure. Referring to FIG. 15, in a process of deriving an intra prediction mode for a chroma component according to an embodiment of the present disclosure, a top-left sample position of a current chroma coding block and a width and a height of the current chroma coding block may be input, and a chroma intra prediction mode may be derived in the process. In FIG. 15, IntraPredModeC indicates an intra prediction mode for a chroma component. xCb and yCb may represent a top-left sample of the chroma coding block on the basis of a luma position. IntraPredModeY may be an intra prediction mode for a luma component.

According to an embodiment of the present disclosure, IntraPredModeC may be determined on the basis of IntraPredModeY. IntraPredModeC may be determined on the basis of IntraPredModeY and intra_chroma_pred_mode. IntraPredModeY may be an intra prediction mode of a luma block corresponding to the current chroma block. According to an embodiment, a use position of IntraPredModeY corresponding to IntraPredModeC of a specific position may be preconfigured. According to an embodiment, the preconfigured position may be a luma block position corresponding to a center position of the current chroma block. For example, in deriving IntraPredModeC of position (xCb, yCb), an encoder/decoder may refer to IntraPredModeY of position (xCb+cbWidth/2, yCb+cbHeight/2). Alternatively, in deriving IntraPredModeC of position (xCb, yCb), the preconfigured position may be a position configured based on luma position (xCb, yCb).

According to an embodiment of the present disclosure, an IntraPredModeC value according to IntraPredModeY may be determined with reference to Table 1 or Table 2 below. Table 1 shows a chroma intra prediction mode determination method when a cross-component linear model (CCLM) may not be used (that is, if sps_cclm_enalbed_flag is 0), and Table 2 shows a chroma intra prediction mode determination method when the CCLM may be used (that is, if sps_cclm_enalbed_flag is 1). A CCLM prediction mode may be a prediction method in which a prediction sample is acquired based on a value (e.g., restored value of another color component) of another color component. Alternatively, the CCLM prediction mode may be a prediction method in which a prediction sample is acquired based on a linear model between color components.

TABLE 1

| | IntraPredModeY[ xCb + cbWidth / 2 ][ yCb + cbHeight / 2 ] | | | | |
|---|---|---|---|---|---|
| intra_chroma_pred_mode[ xCb ][ yCb ] | 0 | 50 | 18 | 1 | X ( 0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

TABLE 2

| | IntraPredModeY[ xCb + cbWidth / 2 ][ yCb + cbHeight / 2 ] | | | | |
|---|---|---|---|---|---|
| intra_chroma_pred_mode[ xCb ][ yCb ] | 0 | 50 | 18 | 1 | X ( 0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

Referring to Table 1 and Table 2, the encoder/decoder may refer to a column according to an IntraPredModeY value of a preconfigured position (e.g., bottom right center luma position of the chroma coding block), and a value corresponding to intra_chroma_pred_mode in the column may be IntraPredModeC. For example, if IntraPredModeY is 1 and intra_chroma_pred_mode is 1, IntraPredModeC may be 50.

According to an embodiment, sps_cclm_enalbed_flag may be a higher level signaling (or syntax element) indicating whether the CCLM is applicable. For example, if sps_cclm_enalbed_flag is 1, the CCLM may be applicable. If sps_cclm_enalbed_flag is 0, the CCLM may not be applicable.

In Table 2, IntraPredModeC value 81, 82, or 83 may indicate that the CCLM mode is applied. IntraPredModeC value 4 when sps_cclm_enabled_flag of Table 1 is 0 may indicate that the prediction mode of the current chroma component corresponds to a DM mode. IntraPredModeC value 7 when sps_cclm_enabled_flag of Table 2 is 1 may indicate that the prediction mode of the current chroma component corresponds to the DM mode.

A bin string that signals intra_chroma_pred_mode may be predefined. For example, the encoder/decoder may indicate the DM mode by using intra_chroma_pred_mode with fewest bits. For example, the encoder/decoder may indicate the DM mode by using 1-bit intra_chroma_pred_mode.

According to an embodiment, if sps_cclm_enalbed_flag is 0, the encoder/decoder may configure (or assign) the number of bits indicating intra_chroma_pred_mode values 4, 0, 1, 2, and 3 to gradually increase or may configure the same to the same value. According to an embodiment, if sps_cclm_enalbed_flag is 0, empty strings representing intra_chroma_pred_mode values 4, 0, 1, 2, and 3 may be configured (or assigned) to 0, 100, 101, 110, and 111, respectively.

According to an embodiment, if sps_cclm_enalbed_flag is 1, the encoder/decoder may configure (or assign) the number of bits representing intra_chroma_pred_mode values 7, 4, 5, 6, 0, 1, 2, and 3 to gradually increase or may configure the same to the same value. According to an embodiment, if sps_cclm_enalbed_flag is 1, empty strings representing intra_chroma_pred_mode values 7, 4, 5, 6, 0, 1, 2, and 3 may be configured (or assigned) to 0, 10, 1110, 1111, 11000, 11001, 11010, and 11011, respectively.

According to the aforementioned embodiments, there may be a case in which intra prediction for a chroma block is not easy. In particular, there may be a case in which it is not easy to derive an intra prediction mode for a chroma block. As described above, if a chroma block corresponds to intra prediction, in order to determine an intra prediction mode, it may be necessary to refer to an intra prediction mode for a corresponding luma block. However, a case in which a corresponding luma position does not use intra prediction, in other words, a case other than MODE_INTRA may occur. For example, if the luma position is MODE_IBC, a corresponding intra prediction mode may not exist. According to an embodiment, in a case of SINGLE_TREE, a corresponding luma block and chroma block may use the same prediction mode. In a case of DUAL_TREE, a corresponding luma block and chroma block may use different prediction modes. In a case of an I tile group, DUAL_TREE may be used. In the case of the I tile group, MODE_INTRA or MODE_IBC may be used. Therefore, in the same position (or corresponding position), there may be a case in which DUAL_TREE_LUMA uses MODE_IBC and DUAL_TREE_CHROMA uses MODE_INTRA.

FIG. 16 is a diagram illustrating a method of deriving an intra prediction mode of a chroma component according to an embodiment of the present disclosure. An embodiment of FIG. 16 may relate to a method for solving the problem described in FIG. 15. According to an embodiment of the present disclosure, if IntraPredModeY does not exist, IntraPredModeY may be configured to a preconfigured mode (or value). In other words, if an intra prediction mode of a luma component at a corresponding position of a chroma component does not exist, a luma intra prediction mode for deriving an intra prediction mode of the chroma component may be configured to a preconfigured mode (or value). Therefore, even if the luma position corresponding to the chroma block does not use intra prediction or uses an IBC mode, IntraPredModeC may be derived based on a preconfigured value.

More specifically, if IntraPredModeY does not exist, IntraPredModeY may be configured to a planar mode (i.e., value 0 or mode number 0). In this case, according to the signaling method described in Table 1 and Table 2 above, an encoder may signal the planar mode to a decoder by using a small number of bits.

Alternatively, if IntraPredModeY does not exist, IntraPredModeY may be configured to a DC mode (i.e., value 1 or mode number 1). In this case, according to the signaling method described in Table 1 and Table 2 above, the encoder may signal the DC mode to the decoder by using a small number of bits.

Alternatively, if IntraPredModeY does not exist, IntraPredModeY may be configured to a vertical mode (i.e., value 50 or mode number 50). In this case, according to the signaling method described in Table 1 and Table 2 above, the encoder may signal the vertical mode to the decoder by using a small number of bits.

Alternatively, if IntraPredModeY does not exist, IntraPredModeY may be configured to a horizontal mode (i.e., value 18 or mode number 18). In this case, according to the signaling method described in Table 1 and Table 2 above, the encoder may signal the horizontal mode to the decoder by using a small number of bits.

As another embodiment, if IntraPredModeY does not exist, IntraPredModeC values corresponding to intra_chroma_pred_mode values may be determined to values that are not shown in Table 1 and Table 2 above. That is, a column, in which no IntraPredModeY value exists, may exist separately. For example, IntraPredModeC corresponding to intra_chroma_pred_mode 4, 0, 1, 2, and 3 may be 0, 1, 50, and 18, respectively. Alternatively, IntraPredModeC corresponding to intra_chroma_pred_mode 4, 0, 1, 2, 3 may be 0, 50, 18, and 1, respectively. This is applicable to both a case where sps_cclm_enabled_flag is 0 and a case where sps_cclm_enabled_flag is 1.

As another embodiment, if IntraPredModeY does not exist, IntraPredModeC may be configured to a preconfigured value. For example, if IntraPredModeY does not exist, IntraPredModeC may be configured to a preconfigured value regardless of intra_chroma_pred_mode. If IntraPredModeY does not exist, an intra_chroma_pred_mode value may always be signaled using 0. For example, if IntraPredModeY does not exist, IntraPredModeC may be configured to the planar mode. Alternatively, if IntraPredModeY does not exist, IntraPredModeC may be configured to a CCLM. Alternatively, if IntraPredModeY does not exist, IntraPredModeC may be configured to a DM mode. If IntraPredModeY does not exist, the decoder may not parse intra_chroma_pred_mode described above in FIG. 14.

As another embodiment, if IntraPredModeY does not exist, the encoder/decoder may change a position referring to IntraPredModeY.

As described above, the case where IntraPredModeY does not exist in the aforementioned embodiments may indicate a case other than a corresponding luma position MODE_INTRA referenced when a chroma intra prediction mode is derived. That is, the case where IntraPredModeY does not exist may indicate a case where CuPredMode[xCb+cbWidth/2][yCb+cbHeight/2] corresponding to a luma component is not MODE_INTRA, or is MODE_IBC when a chroma intra prediction mode of position (xCb, yCb) is derived.

Referring to FIG. 16, in deriving of IntraPredModeC [xCb][yCb], if IntraPredModeY[xCb+cbWidth/2][yCb+cbHeight/2] does not exist (if not MODE_INTRA, or if MODE_IBC), the encoder/decoder may configure IntraPredModeY[xCb+cbWidth/2][yCb+cbHeight/2] to a preconfigured value. IntraPredModeC may be derived with reference to the configured IntraPredModeY[xCb+cbWidth/2][yCb+cbHeight/2] and Table 1 or Table 2 described above.

In deriving of IntraPredModeC[xCb][yCb], if IntraPredModeY[xCb+cbWidth/2][yCb+cbHeight/2] exists, the encoder/decoder may derive IntraPredModeC with reference to IntraPredModeY[xCb+cbWidth/2][yCb+cbHeight/2] and Table 1 or Table 2 described above.

According to another embodiment of the present disclosure, when a chroma block is predicted, if a corresponding luma block uses the IBC mode, a prediction mode may be limited. More specifically, when the chroma block is intra-predicted, if the corresponding luma block uses the IBC mode, an intra-prediction mode may be limited. For example, in this case, the DM mode may not be used. This is because if a corresponding luma block and chroma block use different modes, the similarity between the two may decrease.

According to an embodiment of the present disclosure, a prediction angle of an intra prediction mode may be defined according to a prediction mode index of the intra prediction mode. In an embodiment, a mapping table between prediction mode indices and angles may be defined as shown in Table 3 below. In the specification, an intra prediction mode index may be referred to as a mode index, a prediction mode number, a mode number, or the like.

predModeIntra may be referred to as an intra prediction mode. Further, intraPredAngle is a parameter (or variable) indicating an angle (or prediction angle) of an intra prediction mode. In the specification, intraPredAngle may be referred to as a prediction angle. In an embodiment, a prediction angle may be determined according to an intra prediction mode. The encoder/decoder may determine, based on a prediction angle, a reference sample of which position or angle with respect to a current sample is to be used for prediction.

According to an embodiment of the present disclosure, Table 3 may indicate mapping between angle parameters and prediction mode indices associated with the prediction modes described in FIG. 6. According to an embodiment, the intra prediction mode of Table 3 may indicate an index of a prediction mode to be used for actual prediction, which is transformed from a signaled index. For example, if a current block is a non-square block with respect to a signaled mode index, a transform may be applied via the following processes. In other words, in an embodiment, with respect to a non-square block the width and height of which are not the same, an intra prediction mode may be modified to the following processes.

A. If all of the following conditions are satisfied, the intra prediction mode (predModeIntra) may be configured to (predModeIntra (i.e., signaled mode index)+65).
   a. a case where nTbW is greater than nTbH
   b. a case where the intra prediction mode is greater than or equal to 2
   c. a case where the intra prediction mode is smaller than (whRatio>1)? 12:8

B. Otherwise, if all of the following conditions are satisfied, the intra prediction mode may be configured to (predModeIntra−67).
   a. a case where nTbH is greater than nTbW
   b. a case where the intra prediction mode is equal to or smaller than 66
   c. a case where the intra prediction mode is greater than (whRatio>1)? 56:60

In the aforementioned processes, nTbW represents a width of the current processing block (coding block or transform block), and nTbH represents a height of the current processing block. whRatio is a variable representing a ratio of width to height. For example, whRatio may be configured to Min(Abs(Log 2(nTbW/nTbH), 2). A?B:C represents an operation that derives a value of B if A is true, and derives a value of C if A is false.

TABLE 3

| | | | | | | | | | | | | | | | | | |
|---|---|---|---|---|---|---|---|---|---|---|---|---|---|---|---|---|---|
| predModeIntra | −10 | −9 | −8 | −7 | −6 | −5 | −4 | −3 | −2 | −1 | 2 | 3 | 4 | 5 | 6 | 7 | 8 |
| intraPredAngle | 114 | 93 | 79 | 68 | 60 | 54 | 49 | 45 | 39 | 35 | 32 | 29 | 26 | 23 | 21 | 19 | 17 |
| predModeIntra | 9 | 10 | 11 | 12 | 13 | 14 | 15 | 16 | 17 | 18 | 19 | 20 | 21 | 22 | 23 | 24 | 25 |
| intraPredAngle | 15 | 13 | 11 | 9 | 7 | 5 | 3 | 2 | 1 | 0 | −1 | −2 | −3 | −4 | −7 | −9 | −11 |
| predModeIntra | 26 | 27 | 28 | 29 | 30 | 31 | 32 | 33 | 34 | 35 | 36 | 37 | 38 | 39 | 40 | 41 | 42 |
| intraPredAngle | −13 | −15 | −17 | −19 | −21 | −23 | −26 | −29 | −32 | −29 | −26 | −23 | −21 | −19 | −17 | −15 | −13 |
| predModeIntra | 43 | 44 | 45 | 46 | 47 | 48 | 49 | 50 | 51 | 52 | 53 | 54 | 55 | 56 | 57 | 58 | 59 |
| intraPredAngle | −11 | −9 | −7 | −5 | −3 | −2 | −1 | 0 | 1 | 2 | 3 | 5 | 7 | 9 | 11 | 13 | 15 |
| predModeIntra | 60 | 61 | 62 | 63 | 64 | 65 | 66 | 67 | 68 | 69 | 70 | 71 | 72 | 73 | 74 | 75 | 76 |
| intraPredAngle | 17 | 19 | 21 | 23 | 26 | 29 | 32 | 35 | 39 | 45 | 49 | 54 | 60 | 68 | 79 | 93 | 114 |

In Table 3, predModeIntra is a parameter (or variable) indicating an intra prediction mode (or prediction mode index or prediction mode number). In the specification, According to an embodiment of the present disclosure, a prediction angle of an intra prediction mode may be defined according to a prediction mode index of the intra prediction mode. In an embodiment, a mapping table between prediction mode indices and angles may be defined as shown in Table 4 below.

TABLE 4

| | | | | | | | | | | | | | | | | | |
|---|---|---|---|---|---|---|---|---|---|---|---|---|---|---|---|---|---|
| predModeIntra | −14 | −13 | −12 | −11 | −10 | −9 | −8 | −7 | −6 | −5 | −4 | −3 | −4 | −1 | 2 | 3 | 4 |
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 | | | | | | | | | |
| intraPredAngle | 73 | 86 | 102 | 128 | 171 | 256 | 341 | 512 | | | | | | | | | |

In Table 4, predModeIntra is a parameter (or variable) indicating an intra prediction mode (or prediction mode index or prediction mode number). In the specification, predModeIntra may be referred to as an intra prediction mode. Further, intraPredAngle is a parameter (or variable) indicating an angle (or prediction angle) of an intra prediction mode. In the specification, intraPredAngle may be referred to as a prediction angle. In an embodiment, a prediction angle may be determined according to an intra prediction mode. The encoder/decoder may determine, based on a prediction angle, a reference sample of which position or angle with respect to a current sample is to be used for prediction.

According to an embodiment of the present disclosure, Table 4 may indicate mapping between angle parameters and prediction mode indices associated with the prediction modes described in FIG. 6. According to an embodiment, the intra prediction mode of Table 2 may indicate an index of a prediction mode to be used for actual prediction, which is transformed from a signaled index. For example, if a current block is a non-square block with respect to a signaled mode index, a transform may be applied via the following processes. In other words, in an embodiment, with respect to a non-square block the width and height of which are not the same, an intra prediction mode may be modified to the following processes.

A. If all of the following conditions are satisfied, wideAngle may be configured to 1, and the intra prediction mode (predModeIntra) may be configured to (predModeIntra (i.e., signaled mode index)+65).
   a. a case where nTbW is greater than nTbH
   b. a case where the intra prediction mode is greater than or equal to 2
   c. a case where the intra prediction mode is smaller than (whRatio>1)? (8+2*whRatio):8
B. Otherwise, if all of the following conditions are satisfied, wideAngle may be configured to 1, and the intra prediction mode may be configured to (predModeIntra−67).
   a. a case where nTbH is greater than nTbW
   b. a case where the intra prediction mode is smaller than or equal to 66
   c. a case where the intra prediction mode is greater than (whRatio>1)? (60−2*whRatio):60

In the aforementioned processes, nTbW represents a width of the current processing block (coding block or transform block), and nTbH represents a height of the current processing block. whRatio is a variable (or parameter) representing a ratio of width to height. For example, whRatio may be configured to Min(Abs(Log 2(nTbW/nTbH), 2). A?B:C represents an operation that derives a value of B if A is true, and derives a value of C if A is false. wideAngle is a variable (or parameter) indicating whether a wide angle is applied to the current block.

According to an embodiment of the present disclosure, the intra prediction angles described in Table 3 and Table 4 may be used (or applied) in the following way. For example, invAngle which is an inverse angle parameter may be derived based on a predicted angle. More specifically, invAngle may be derived to be Round (256*32/intraPredAngle). The encoder/decoder may generate an array of reference samples on the basis of invAngle. The encoder/decoder may perform position-dependent intra prediction sample filtering based on invAngle. Values of variables iIdx and iFact for specification of a position of a reference sample (or prediction sample) may be derived based on an intra prediction angle. A prediction sample may be derived based on iIdx and iFact. A prediction sample may be derived based on ref, iIdx, and iFact.

In an embodiment, the encoder/decoder may generate a prediction sample based on an intra prediction angle by applying a method described below. If an intra prediction mode is greater than or equal to 34, index variable iIdx and multiplication factor iFact may be derived based on Equation 1 below.

$$iIdx = ((y+1+refIdx)*intraPredAngle) >> 5 + refIdx \quad \text{[Equation 1]}$$

$$iFact = ((y+1+refIdx)*intraPredAngle) \,\&\, 31$$

In Equation 1, refIdx may be an index indicating a reference sample line to use for intra prediction. A prediction sample may be derived as in Equation 2 below.

$$predSamples[x][y] = Clip1Y(((\text{summation } \{i \text{ is from } 0 \text{ to } 3\} (fT[i] * ref[x + iIdx + i]) + 32) >> 6) \quad \text{[Equation 2]}$$

In an embodiment, prediction sample derivation according to Equation 2 may be performed if cIdx is 0 (that is, if a current component is a luma component). In Equation 2, fT may be interpolation filter coefficients. In addition, summation {i is from x to y} (eq(i)) represents an operation of adding values of eq(i) while changing i from x to y. Operation Clip1Y may have the same meaning as that of Equation 3 below.

$$Clip1Y(x) = Clip3(0, (1 << BitDepthY) 1, x) \quad \text{[Equation 3]}$$

$$Clip1C(x) = Clip3(0, (1 << BitDepthC) 1, x)$$

Clip3(x, y, z) may be x when z<x, may be y when z>y, and may be z otherwise.

A prediction sample may be derived according to the following processes.

If iFact is not 0, predSamples[x][y] indicating a prediction sample value may be derived according to Equation 4 below.

$$predSamples[x][y] = ((32 - iFact) * ref[x + iIdx + 1] + iFact * ref[x + iIdx + 2] + 16) >> 5 \quad \text{[Equation 4]}$$

Otherwise, predSamples[x][y] indicating a prediction sample value may be derived according to Equation 5 below.

$$predSamples[x][y] = ref[x + iIdx + 1] \quad \text{[Equation 5]}$$

In an embodiment, derivation by Equations 4 and 5 may be performed if cIdx is not 0 (that is, if a current component is a chroma component). If the intra prediction mode is smaller than 34, index variable iIdx and multiplication factor iFact may be derived based on Equation 6 below.

$$iIdx = ((x + 1 + refIdx) * intraPredAngle) >> 5 \quad \text{[Equation 6]}$$

$$iFact = ((x + 1 + refIdx) * intraPredAngle)\ \&\ 31$$

In Equation 6, refIdx may be an index indicating a reference sample line to use for intra prediction. A prediction sample may be derived as in Equation 7 below.

$$predSamples[x][y] = Clip1Y(((\text{summation } \{i \text{ is from } 0 \text{ to } 3\} (fT[i] * ref[y + iIdx + i]) + 32) >> 6) \quad \text{[Equation 7]}$$

In an embodiment, prediction sample derivation according to Equation 7 may be performed if cIdx is 0 (that is, if a current component is a luma component). In Equation 2, fT may be interpolation filter coefficients. In addition, summation {i is from x to y} (eq(i)) represents an operation of adding values of eq(i) while changing i from x to y.

A prediction sample may be derived according to the following processes.

If iFact is not 0, predSamples[x][y] indicating a prediction sample value may be derived according to Equation 8 below.

$$predSamples[x][y] = ((32 - iFact) * ref[y + iIdx + 1] + iFact * ref[y + iIdx + 2] + 16) >> 5 \quad \text{[Equation 8]}$$

Otherwise, predSamples[x][y] indicating a prediction sample value may be derived according to Equation 9 below.

$$predSamples[x][y]] = ref[y + iIdx + 1] \quad \text{[Equation 9]}$$

In an embodiment, derivation by Equations 8 and 9 may be performed if cIdx is not 0 (that is, if a current component is a chroma component).

In comparison of Table 3 and Table 4 described above, intra prediction modes of −14 to −11 and 77 to 80 are added in Table 4 compared to Table 3. In Table 3 and Table 4, different intra prediction angle values may be determined for the same intra prediction mode. For example, referring to Table 3 and Table 4, intra prediction angle values may be defined (or configured) differently in intra prediction modes of −10 to −4, 6 to 14, 22 to 30, 38 to 46, 54 to 62, and 70 to 76.

Table 5 below illustrates a prediction sample deriving process which represents the embodiment described above more specifically.

TABLE 5

| | |
|---|---|
| The values of the prediction samples predSamples[ x ][ y ], with x = 0..nTbW − 1, y − 0..nTbH − 1 are derived as follows: | |
| - If predModeIntra is greater than or equal to 34, the following ordered steps apply: | |
| 1. The reference sample array ref[ x ] is specified as follows: | |
| - The following applies: | |
| ref[ x ] = p[ −1 − refIdx + x ][ −1 − refIdx ], with x = 0..nTbW + refIdx | (8-90) |
| - If intraPredAngle is less than 0, the main reference sample array is extended as follows: | |
| - When ( nTbH * intraPredAngle ) >> 5 is less than −1, | |
| ref[ x ] = p[ −1 − refIdx ][ −1 − refIdx + ( ( x * invAngle + 128 ) >> 8 ) ], with x = −1..( nTbH * intraPredAngle ) >> 5 | (8-91) |
| ref[ ( ( nTbH * intraPredAngle ) >> 5 ) − 1 ] = ref[ ( nTbH * intraPredAngle ) >> 5 ] | (8-92) |
| ref[ nTbW + 1 + refIdx ] = ref[ nTbW + refIdx ] | (8-93) |

TABLE 5-continued

| | |
|---|---|
| - Otherwise, | |
| ref[ x ] = p[ −1 − refIdx + x ][ −1 − refIdx ], with x = nTbW + 1 + refIdx..refW + refIdx | (8-94) |
| ref[ −1 ] = ref[ 0 ] | (8-95) |
| - The additional samples ref[ refW + refIdx +x ] with x = 1..( Max( 1, nTbW / nTbH ) * refIdx + 1) are derived as follows: | |
| ref[ refW + refIdx + x ] = p[ −1 + refW ][ −1 − refIdx ] | (8-96) |
| 2. The values of the prediction samples predSamples[ x ][ y ], with x = 0..nTbW − 1, y = 0..nTbH − 1 are derived as follows: | |
| - The index variable iIdx and the multiplication factor iFact are derived as follows: | |
| iIdx = ( ( y + 1 + refIdx ) * intraPredAngle ) >> 5 + refIdx | (8-97) |
| iFact = ( ( y + 1 + refIdx ) * intraPredAngle ) & 31 | (8-98) |
| - If cIdx is equal to 0, the following applies: | |
| - The interpolation filter coefficients fT[ j ] with j = 0..3 are derived as follows: | |
| fT[ j ] = filterFlag ? fG[ iFact ][ j ] : fC[ iFact ][ j ] | (8-99) |
| - The value of the prediction samples predSamples[ x ][ y ] is derived as follows: | |
| predSamples[ x ][ y ] = Clip1Y( ( ( $\Sigma_{i=0}^{3}$ fT[ i ] * ref[ x + iIdx + i ] ) + 32 ) >> 6 ) | (8-100) |
| - Otherwise (cIdx is not equal to 0), depending on the value of iFact, the following applies: | |
| - If iFact is not equal to 0, the value of the prediction samples predSamples[ x ][ y ] is derived as follows: | |
| predSamples[ x ][ y ] = | |
| ( ( 32 − iFact ) * ref[ x + iIdx + 1 ] + iFact * ref[ x + iIdx + 2 ] + 16 ) >> 5 | (8-101) |
| - Otherwise, the value of the prediction samples predSamples[ x ][ y ] is derived as follows: | |
| predSamples[ x ][ y ] = ref[ x + iIdx + 1 ] | (8-102) |
| - Otherwise (predModeIntra is less than 34), the following ordered steps apply: | |
| 1. The reference sample array ref[ x ] is specified as follows: | |
| - The following applies: | |
| ref[ x ] = p[ −1 − refIdx ][ −1 −refIdx + x ], with x = 0..nTbH + refIdx | (8-103) |
| - If intraPredAngle is less than 0, the main reference sample array is extended as follows: | |
| - When ( nTbW * intraPredAngle ) >> 5 is less than −1, | |
| ref[ x ] = p[ −1 − refIdx + ( ( x * invAngle + 128 ) >> 8 ][ −1 − refIdx ], with x = −1..( nTbW * intraPredAngle ) >> 5 | (8-104) |
| ref[ ( ( nTbW * intraPredAngle ) >> 5 ) − 1 ] = ref[ ( nTbW * intraPredAngle ) >> 5 ] | (8-105) |
| ref[ nTbG + 1 + refIdx ] = ref[ nTbH + refIdx ] | (8-106) |
| - Otherwise, | |
| ref[ x ] = p[ −1 − refIdx ][ −1 − refIdx + x ], with x = nTbH + 1 + refIdx..refH + refIdx | (8-107) |
| ref[ −1 ] = ref[ 0 ] | (8-108) |
| - The additional samples ref[ refH + refIdx + x ] with x = 1..( Max( 1, nTbW / nTbH ) * refIdx + 1) are derived as follows: | |
| ref[ refH + refIdx +x ] = p[ −1 + refH ][ −1 − refIdx ] | (8-109) |
| 2. The values of the prediction samples predSamples[ x ][ y ], with x = 0..nTbW − 1, y = 0..nTbH − 1 are derived as follows: | |
| - The index variable iIdx and the multiplication factor iFact are derived as follows: | |
| iIdx = ( ( x + 1 + refIdx ) * intraPredAngle) >> 5 | (8-110) |
| iFact = ( ( x + 1 + refIdx ) * intraPredAngle ) & 31 | (8-111) |
| - If cIdx is equal to 0, the following applies: | |
| - The interpolation filter coefficients fT[ j ] with j = 0..3 are derived as follows: | |
| fT[ j ] = filterFlag ? fG[ iFact ][ j ] : fC[ iFact ][ j ] | (8-112) |
| - The value of the prediction samples predSamples[ x ][ y ] is derived as follows: | |
| predSamples[ x ][ y ] = Clip1Y( ( ( $\Sigma_{i=0}^{3}$ fT[ i ] * ref[ y + iIdx + i ] ) + 32 ) >> 6 ) | (8-113) |
| - Otherwise (cIdx is not equal to 0), depending on the value of iFact, the following applies: | |
| - If iFact is not equal to 0, the value of the prediction samples predSamples[ x ][ y ] is derived as follows: | |
| predSamples[ x ][ y ] = | |
| ( ( 32 − iFact ) * ref[ y + iIdx + 1 ] + iFact * ref[ y + iIdx + 2 ] + 16 ) >> 5 | (8-114) |
| - Otherwise, the value of the prediction samples predSamples[ x ][ y ] is derived as follows: | |
| predSamples[ x ][ y ] = ref[ y + iIdx + 1 ] | (8-115) |

In Table 5, p[x][y] may indicate a neighboring reference sample. Top-left coordinates of the current block may be defined to be (0,0). Referring to Table 5, the encoder/decoder may derive a prediction sample of the current block according to the process shown in Table 5. The encoder/decoder may apply different derivation methods according to the intra prediction mode of the current block. Specifically, the encoder/decoder may derive a reference sample array (may be referred to as a main reference sample) on the basis of the prediction mode of the current block, and may derive a prediction sample of the current block on the basis of the derived reference sample. In this case, the methods described above in Equations 1 to 9 may be applied.

FIG. 17 is a diagram illustrating an intra prediction mode deriving method according to an embodiment of the present disclosure. Referring to FIG. 17, IntraPredModeY may be a value indicating an intra prediction mode. For example, IntraPredModeY may be a value indicating a luma intra prediction mode. According to an embodiment of the present disclosure, there may be a method of deriving IntraPredModeY from a mode list. In another embodiment, there may be a method of deriving IntraPredModeY from modes that are not included in the mode list. In the present disclosure, the mode list may be referred to as an MPM list, a candidate list, and a candidate mode list. For example, the mode list may be variable candModeList which indicates the candidate mode list of FIG. 17. According to an embodiment, one or more mode lists may exist. The number of modes included in a mode list may be one or more.

According to an embodiment of the present disclosure, the method of deriving an intra prediction mode may be configured (or defined) differently based on a most probable mode (MPM) flag. Here, a most probable mode (MPM) indicates a mode in which an intra prediction mode of a current block is derived from an intra predicted block neighboring the current block. The most probable mode (MPM) flag indicates a flag (or syntax element) indicating whether the intra prediction mode of the current block is encoded using the MPM. In the present disclosure, the MPM flag may be expressed as intra_luma_mpm_flag. For example, if the MPM flag is 1, IntraPredModeY may be derived from the mode list, as described above. Alternatively, if the MPM flag is 0, IntraPredModeY may be derived from modes that are not included in the mode list, as described above.

In an embodiment, if the MPM flag is 1, IntraPredModeY may be configured based on a signaled index. For example, if the MPM flag is 1, IntraPredModeY may be configured based on the signaled index and the mode list. More specifically, referring to FIG. 17, if the MPM flag is 1, IntraPredModeY may be configured to candModeList[intra_luma_mpm_idx].

In the present disclosure and drawings, a parameter (or variable) value or a syntax element value may be based on coordinates or a position, wherein, if the parameter or the syntax element value corresponds to the current block, notation thereof may be omitted. For example, [xCb][yCb] may indicate a position of the current block in FIG. 17, but may be omitted when descriptions are provided in the present disclosure.

As an embodiment, if the MPM flag is 0, candidate mode list rearrangement and IntraPredModeY configuration may be performed. A candidate mode list before rearrangement may be an MPM list. The rearrangement may be rearrangement of candidate mode list values. For example, when candidate mode lists before rearrangement are candModeList[0]=a_0, candModeList[1]=a_1, candModeList[2]=a_2, . . . , and candModeList[N−1]=a_{N−1}, a_0, a_1, a_2, . . . , and a_{N−1} may be arranged and assigned to candModeList[0], candModeList[1], candModeList[2], . . . , and candModeList[N−1]. Here, arrangement may be performed in ascending or descending order. For example, when a_0, a_1, a_2, . . . , and a_{N−1} are arranged in ascending order, the arrangement may result in b_0, b_1, b_2, . . . , and b_{N−1}, and configuration may be performed to candModeList[0]=b_0, candModeList[1]=b_1, candModeList[2]=b_2, . . . , and candModeList[N−1]=b_{N−1}. A part indicated by (1.) of FIG. 17 may correspond to rearrangement of the candidate mode lists. For example, candModeList[i] may be defined from i=0 to N−1. In this case, with respect to i that is from 0 to (N−2), and j that is from (i+1) to (N−1) for each i, if candModeList[i] is greater than candModeList[j], values of candModeList[i] and candModeList[j] may be swapped. A swap operation may be expressed as (candModeList[i], candModeList[j])=Swap (candModeList[i], candModeList[j]). A result of Swap(x, y) may be (y, x).

Therefore, the operation of (candModeList[i], candModeList[j])=Swap(candModeList[i], candModeList[j]) may cause candModeList[i] and candModeList[j], which are a and b respectively before the operation is performed, to become candModeList[i] and candModeList[j] which are b and a respectively after the operation is performed. Referring to FIG. 17, N may be 6. In candModeList[i], i may be configured to be from 0 to 5.

Configuration of IntraPredModeY may be based on an intra_luma_mpm_remainder value. Referring to FIG. 17, IntraPredModeY may be configured based on intra_luma_mpm_remainder. Modification of IntraPredModeY on the basis of the candidate mode lists may be followed. For example, with respect to i that is from 0 to N−1, if IntraPredModeY is greater than or equal to candModeList[i], 1 may be added to IntraPredModeY. A value based on IntraPredModeY, which is generated as a result of the addition, may be used for an intra prediction mode. For example, wide angle determination and mode modification processes may be performed after IntraPredModeY derivation described in the present disclosure.

Referring to FIG. 17, the processes may be procedures performed in a part indicated by (2.) of FIG. 17. In a case where i may be configured from 0 to 5, if IntraPredModeY is greater than or equal to candModeList[i] with respect to i of 0 to 5, candModeList[i] may add 1 to IntraPredModeY. The aforementioned modification of IntraPredModeY may be necessary because, if the MPM flag is 0, signaling is performed using intra_luma_mpm_remainder from among modes other than those included in the mode list. For example, this is because, in a case where candModeList[0]=0, candModeList[1]=3, candModeList[2]=1, candModeList[3]=5, candModeList[4]=33, and candModeList[5]=65, when a value included in the candidate mode lists is signaled, the MPM flag may be 1, and when the MPM flag is 0, possible values of IntraPredModeY may be 2, 4, 6, . . . , 32, 34, . . . , 64, 66, etc. In this case, when intra_luma_mpm_remainder is signaled with 0, this may indicate IntraPredModeY 2.

FIG. 18 is a diagram illustrating an MPM list configuration method according to an embodiment of the present disclosure. An MPM list may be a candidate mode list. According to an embodiment of the present disclosure, an MPM list may be configured based on candIntraPredModeX. For example, there may be a plurality of candIntraPredModeX. For example, candIntraPredModeX may be candIntraPredModeA and candIntraPredModeB. For example, candIntraPredModeX may be IntraPredModeY corresponding to a position around a current block. Alternatively, candIntraPredModeX indicates a preconfigured mode. For example, candIntraPredModeX may be INTRA_PLANAR. INTRA_PLANAR may be a value corresponding to mode index (or mode number) 0. INTRA_DC may be a value corresponding to mode index (or mode number) 1. Referring to FIG. 18, INTRA_PLANAR and INTRA_DC are indicated as planar and DC, respectively.

According to an embodiment of the present disclosure, candidate mode lists may always include a specific value. A position of the specific value in the candidate mode lists may be fixed. For example, the candidate mode lists may always include INTRA_PLANAR. INTRA_PLANAR may always be located at the forefront of the candidate mode lists. As another example, the candidate mode lists may always include INTRA_DC.

FIG. 18 shows a simplified MPM list configuration method. According to an embodiment, candIntraPredModeA and candIntraPredModeB may be IntraPredModeY corresponding to the left and upper sides around the current block, respectively. For example, candIntraPredModeA may be IntraPredModeY[xCb−1][yCb+cbHeight−1]. For example, candIntraPredModeB may be IntraPredModeY [xCb+cbWidth−1][yCb−1]. [xCb][yCb] may be coordinates corresponding to the current block. More specifically, [xCb][yCb] may be coordinates corresponding to the top-left of the current block. Further, cbWidth and cbHeight may be the width and height of the current block, respectively. As described above, candIntraPredModeA and candIntraPredModeB may be configured to preconfigured values.

According to an embodiment, the MPM list configuration method may vary based on whether candIntraPredModeA and candIntraPredModeB are the same or different. The MPM list configuration method may vary depending on whether or not candIntraPredModeA and candIntraPredModeB are an angular mode. The angular mode may not include INTRA_PLANAR and INTRA_DC. The angular mode may be any value other than INTRA_PLANAR and INTRA_DC. A value corresponding to the angular mode may be larger than INTRA_PLANAR and INTRA_DC values. INTRA_PLANAR and INTRA_DC may be referred to as a non-angular mode.

If candIntraPredModeA and candIntraPredModeB the same, and candIntraPredModeA is the angular mode, the candidate mode lists may be determined as follows.

$$-candModeList[0] = \text{INTRA\_PLANAR}$$
$$-candModeList[1] = candIntraPredModeA$$
$$-candModeList[2] = 2 + ((candIntraPredModeA + 61)\,\%64)$$
$$-candModeList[3] = 2 + ((candIntraPredModeA - 1)\,\%64)$$
$$-candModeList[4] = \text{INTRA\_DC}$$
$$-candModeList[5] = 2 + ((candIntraPredModeA + 60)\,\%64)$$

Here, % may represent a modular operation.

If candIntraPredModeA and candIntraPredModeB are not the same, and candIntraPredModeA or candIntraPredModeB is the angular mode, the candidate mode lists may be determined as follows.

minAB=Min(candIntraPredModeA, candIntraPredModeB)

maxAB=Max(candIntraPredModeA, candIntraPredModeB)

If both candIntraPredModeA and candIntraPredModeB are the angular mode, the candidate mode lists may be determined as follows. That is, when combined with the preceding conditions, candIntraPredModeA and candIntraPredModeB are not the same, and both candIntraPredModeA and candIntraPredModeB are the angular mode.

$$-candModeList[0] = \text{INTRA\_PLANAR}$$
$$-candModeList[1] = candIntraPredModeA$$
$$-candModeList[2] = candIntraPredModeB$$
$$-candModeList[3] = \text{INTRA\_DC}$$

If $\max AB - \min AB$ is in the range of 2 to 62 (inclusive):

$$-candModeList[4] = 2 + ((\max AB + 61)\,\%64)$$
$$-candModeList[5] = 2 + ((\max AB - 1)\,\%64)$$

If $\max AB - \min AB$ is in the range of 2 to 62 (inclusive):

$$-candModeList[4] = 2 + ((\max AB + 60)\,\%64)$$
$$-candModeList[5] = 2 + ((\max AB)\,\%64)$$

If candIntraPredModeA and candIntraPredModeB are not the same, and candIntraPredModeA or candIntraPredModeB is the angular mode, the candidate mode lists may be determined as follows.

minAB=Min(candIntraPredModeA, candIntraPredModeB)

maxAB=Max(candIntraPredModeA, candIntraPredModeB)

If only one of candIntraPredModeA and candIntraPredModeB is the angular mode, the candidate mode lists may be determined as follows. That is, when combined with the preceding conditions, candIntraPredModeA and candIntraPredModeB are not the same, and only one of candIntraPredModeA and candIntraPredModeB is the angular mode.

$$-candModeList[0] = \text{INTRA\_PLANAR}$$
$$-candModeList[1] = \max AB$$
$$-candModeList[2] = \text{INTRA\_DC}$$
$$-candModeList[3] = 2 + ((\max AB + 61)\,\%64)$$
$$-candModeList[4] = 2 + ((\max AB - 61)\,\%64)$$
$$-candModeList[5] = 2 + ((\max AB + 60)\,\%64)$$

In other cases, the candidate mode lists may be determined as follows. That is, 1) if candIntraPredModeA and candIntraPredModeB are the same, and candIntraPredModeA is the non-angular mode, or 2) if candIntraPredModeA and candIntraPredModeB are not the same, and both candIntraPredModeA and candIntraPredModeB are the non-angular, the candidate mode lists may be determined as follows.

candModeList[0]=INTRA_PLANAR
candModeList[1]=INTRA_DC
candModeList[2]=INTRA_ANGULAR50
candModeList[3]=INTRA_ANGULAR18
candModeList[4]=INTRA_ANGULAR46
candModeList[5]=INTRA_ANGULAR54

Here, INTRA_ANGULARxx may be a value corresponding to mode index (or mode number) xx.

FIG. 19 is a diagram illustrating deriving of an intra prediction mode according to an embodiment of the present disclosure. The mode driving method described in FIG. 17 may include a redundant operation. For example, when the MPM list configuration method described in FIG. 18 is used, the mode driving method described in FIG. 17 may include a redundant operation. In description of an embodiment of the present disclosure, descriptions overlapping with FIG. 17 will be omitted.

As an embodiment, if an MPM flag is 0, candidate mode list rearrangement and IntraPredModeY configuration may be performed. Candidate mode lists before rearrangement may be MPM lists. The rearrangement may be rearrangement of candidate mode list values. When candidate mode list rearrangement is performed, if candModeList[i] is greater than candModeList[j], values of candModeList[i] and candModeList[j] may be swapped. A swap operation may be expressed as (candModeList[i], candModeList[j])=Swap(candModeList[i], candModeList[j]). A result of Swap (x, y) may be (y, x). Therefore, the operation of (candModeList[i], candModeList[j])=Swap(candModeList[i], candModeList[j]) may cause candModeList[i] and candModeList[j], which are a and b respectively before the operation is performed, to become candModeList[i] and candModeList[j] which are b and a respectively after the operation is performed.

According to an embodiment of the present disclosure, rearrangement may be performed only for some of candidate mode lists, not for all candidate mode lists. That is, when candModeList[i] is defined for i that is from 0 to N−1, rearrangement may be performed only for fewer candidate mode lists than N, not for all candidate mode lists. A candidate mode list, for which rearrangement is not performed, may be preconfigured. For example, the candidate mode list, for which rearrangement is not performed, may be related to a mode index existing at the same position in a configuration method which varies depending on a case in the MPM list configuration. For example, rearrangement may be performed only for candidate mode lists remaining after excluding candModeList[0]. For example, when candModeList[i] is defined for i=0 to N−1, if candModeList[i] is greater than candModeList[j] with respect to i that is from 0 to (N−2) and j that is from (i+1) to (N−1) for each i, values of candModeList[i] and candModeList[j] may be swapped.

This may be because the same result is obtained whether or not rearrangement is performed for candModeList[0]. For example, as described in FIG. 18, candModeList[0] can always be INTRA_PLANAR, and in this case, candModeList[0] may always have a minimum value.

Referring to FIG. 19, in a part indicated by (1.) of FIG. 19, candidate mode list rearrangement is performed. For example, N may be 6. In candModeList[i], i may be defined from 0 to 5. That is, the candidate mode lists may have a total of 6 elements. In this case, with respect to i that is from 1 to 4 and j that is from (i+1) to 5 for each i, if candModeList[i] is greater than candModeList[j], values of candModeList[i] and candModeList[j] may be swapped. A swap operation may be expressed as (candModeList[i], candModeList[j])=Swap(candModeList[i], candModeList[j]).

IntraPredModeY configuration may be based on an intra_luma_mpm_remainder value. Referring to FIG. 19, IntraPredModeY may be configured based on intra_luma_mpm_remainder. Modification of IntraPredModeY may follow. In this case, modification of IntraPredModeY without being based on the candidate mode lists, and modification of IntraPredModeY on the basis of the candidate mode lists may be included.

According to an embodiment, intra_luma_mpm_remainder may be a syntax element. Further, intra_luma_mpm_remainder may be a value signaled when a mode that is not included in the MPM lists is indicated. For example, intra_luma_mpm_remainder may be a value signaled when the MPM flag is 0. In intra_luma_mpm_remainder, a value smaller than a total number of intra modes may be a maximum value. For example, in intra_luma_mpm_remainder, ((total number of intra modes in signaling range)−(number of elements in MPM lists)−1) may have a maximum value. For example, (total number of intra modes in signaling range) may be 67. For example, (number of elements in MPM lists) may be 6. For example, a maximum value of intra_luma_mpm_remainder may be 60.

According to an embodiment of the present disclosure, modification of IntraPredModeY may include performing a preconfigured modification without being based on the candidate mode lists. For example, modification of IntraPredModeY may include adding a preconfigured value to IntraPredModeY. Referring to a part indicated by (ii.) of FIG. 19, a value obtained by adding 2 to an IntraPredModeY value may be configured as IntraPredModeY.

According to an embodiment of the present disclosure, modification of IntraPredModeY may include modifying IntraPredModeY on the basis of the candidate mode lists. For example, IntraPredModeY is compared with candModeList[i], and if a condition is satisfied, modification of IntraPredModeY may be performed. According to an embodiment of the present disclosure, when comparison with candModeList[i] is performed and IntraPredModeY is modified, comparison and modification may be performed only for some of candidate mode lists, not for all the candidate mode lists. That is, when candModeList[i] is defined for i that is from 0 to N−1, comparison and modification may be performed only for fewer candidate mode lists than N, not for all the candidate mode lists. A candidate mode list, for which comparison and modification are not performed, may be preconfigured. For example, the candidate mode list, for which comparison and modification are not performed, may be related to a mode index to be included in several cases in a configuration method which varies depending on a case in the MPM list configuration. For example, comparison with IntraPredModeY and modification of IntraPredModeY may be performed only for candidate mode lists remaining after excluding candModeList[0] or candModeList[1].

For example, when candModeList[i] is defined from i=0 to N−1, comparison with IntraPredModeY and modification of IntraPredModeY may be performed with respect to i having a value larger than 0 to a value of (N−1). For example, when candModeList[i] is defined from i=0 to N−1, comparison with IntraPredModeY and modification of IntraPredModeY may be performed with respect to i that is from 2 to (N−1).

For example, comparison and modification may be as follows. For example, if IntraPredModeY is greater than or equal to candModeList[i], modification of IntraPredModeY may be performed. For example, if IntraPredModeY is greater than or equal to candModeList[i], an IntraPredModeY value may be increased by 1.

Referring to a part indicated by (iii.) of FIG. 19, if IntraPredModeY is greater than or equal to candModeList[i] with respect to i that is 2 to 5, IntraPredModeY may be increased by 1. This is because the candidate mode lists may always include certain mode indices. This is also because a fixed mode index may exist at a certain position in the rearranged candidate mode lists. For example, in the rearranged candidate mode lists, candModeList[0] may always be INTRA_PLANAR, and candModeList[1] may always be INTRA_DC.

According to an embodiment of the present disclosure, in modification of IntraPredModeY, the preconfigured value during the preconfigured modification performed without being based on the candidate mode lists may be associated with the number of candidate mode lists excluded from comparison targets during modification of IntraPredModeY performed based on the candidate mode lists. For example, if M out of all the candidate mode lists are excluded from the comparison targets during modification of IntraPredModeY performed based on the candidate mode lists, the preconfigured value during the preconfigured modification performed without being based on the candidate mode lists may be M or greater. More specifically, for example, if M out of all the candidate mode lists are excluded from the comparison targets during modification of IntraPredModeY performed based on the candidate mode lists, the preconfigured value during the preconfigured modification performed without being based on the candidate mode lists may be M. For example, M may be 2.

Accordingly, referring to FIG. 19, modification of IntraPredModeY may be as follows. An IntraPredModeY value may be configured to an intra_luma_mpm_remainder value. The IntraPredModeY value may be increased by 2. With respect to i that is 2 to 5 (inclusive), when IntraPredModeY is greater than or equal to candModeList[i], IntraPredModeY may be increased by 1.

FIG. 19 shows that rearrangement of the candidate mode lists and modification of IntraPredModeY are performed when the MPM flag is 0. However, as descriptions which will be provided later in FIG. 20 to FIG. 22, if a planar flag exists, or in a case where a signaling is performed by dividing a preconfigured mode, a mode included in the candidate mode lists, and other modes, the method described in the embodiment of FIG. 19 may be used when other modes are derived. The planar flag indicates a flag (or syntax element) indicating whether an intra prediction mode is a planar mode, and may be expressed as planar_flag in the present disclosure.

FIG. 20 is a diagram illustrating an MPM list configuration method according to an embodiment of the present disclosure. According to an embodiment of the present disclosure, INTRA_PLANAR may be indicated by a planar flag. The planar flag may be a signaling (or syntax element) different from an MPM flag described above. According to an embodiment of the present disclosure, a preconfigured mode may not always be included in an MPM list, i.e., a candidate mode list. According to an embodiment of the present disclosure, INTRA_PLANAR may not always be included in an MPM list, i.e., a candidate mode list.

An MPM list may be a candidate mode list. According to an embodiment of the present disclosure, an MPM list may be configured based on candIntraPredModeX. For example, there may be a plurality of candIntraPredModeX. For example, candIntraPredModeX may be candIntraPredModeA and candIntraPredModeB. For example, candIntraPredModeX may be IntraPredModeY corresponding to a position around a current block. Alternatively, candIntraPredModeX may indicate a preconfigured mode. For example, candIntraPredModeX may be INTRA_PLANAR. INTRA_PLANAR may be a value corresponding to mode index 0. INTRA_DC may be a value corresponding to mode index 1. Referring to FIG. 20, INTRA_PLANAR and INTRA_DC may be expressed as planar and DC, respectively.

According to an embodiment of the present disclosure, candidate mode lists may always include a specific value. A position of the specific value in the candidate mode lists may be fixed. For example, the candidate mode lists may always include INTRA_DC.

FIG. 20 shows a simplified MPM list configuration method. According to an embodiment, candIntraPredModeA and candIntraPredModeB may be IntraPredModeY corresponding to the left and upper sides around the current block, respectively. For example, candIntraPredModeA may be IntraPredModeY[xCb−1][yCb+cbHeight−1]. For example, candIntraPredModeB may be IntraPredModeY [xCb+cbWidth−1][yCb−1]. [xCb][yCb] may be coordinates corresponding to the current block. More specifically, [xCb] [yCb] may be coordinates corresponding to the top-left of the current block. Further, cbWidth and cbHeight may be the width and height of the current block, respectively. As described above, it may be possible that candIntraPredModeA and candIntraPredModeB are configured to preconfigured values.

According to an embodiment, the MPM list configuration method may vary based on whether candIntraPredModeA and candIntraPredModeB are the same or different. The MPM list configuration method may vary depending on whether or not candIntraPredModeA and candIntraPredModeB are an angular mode. The angular mode may not include INTRA_PLANAR and INTRA_DC. The angular mode may be any value other than INTRA_PLANAR and INTRA_DC. A value corresponding to the angular mode may be larger than INTRA_PLANAR and INTRA_DC values. INTRA_PLANAR and INTRA_DC may be referred to as a non-angular mode.

If candIntraPredModeA and candIntraPredModeB are the same, and candIntraPredModeA is the angular mode, the candidate mode lists may be determined as follows.

$$-candModeList[0] = candIntraPredModeA$$

$$-candModeList[1] = 2 + ((candIntraPredModeA + 61)\,\%64)$$

$$-candModeList[2] = 2 + ((candIntraPredModeA - 1)\,\%64)$$

$$-candModeList[3] = \text{INTRA\_DC}$$

$$-candModeList[4] = 2 + ((candIntraPredModeA + 60)\,\%64)$$

Here, % may represent a modular operation.

If candIntraPredModeA and candIntraPredModeB are not the same, and candIntraPredModeA or candIntraPredModeB is the angular mode, the candidate mode lists may be determined as follows.

minAB=Min(candIntraPredModeA, candIntraPredModeB)

maxAB=Max(candIntraPredModeA, candIntraPredModeB)

If both candIntraPredModeA and candIntraPredModeB are the angular mode, the candidate mode lists may be determined as follows. That is, when combined with the preceding conditions, candIntraPredModeA and candIntraPredModeB are not the same, and both candIntraPredModeA and candIntraPredModeB are the angular mode.

$$-candModeList[0] = candIntraPredModeA$$

$$-candModeList[1] = candIntraPredModeB$$

$$-candModeList[2] = \text{INTRA\_DC}$$

If $\max AB - \min AB$ is in the range of 2 to 62 (inclusive):

$$-candModeList[3] = 2 + ((\max AB + 61)\,\%64)$$

$$-candModeList[4] = 2 + ((\max AB - 1)\,\%64)$$

If $\max AB - \min AB$ is in the range of 2 to 62 (inclusive):

$$-candModeList[3] = 2 + ((\max AB + 60)\,\%64)$$

$$-candModeList[4] = 2 + ((\max AB)\,\%64)$$

If candIntraPredModeA and candIntraPredModeB are not the same, and candIntraPredModeA or candIntraPredModeB is the angular mode, the candidate mode lists may be determined as follows.

minAB=Min(candIntraPredModeA, candIntraPredModeB)

maxAB=Max(candIntraPredModeA, candIntraPredModeB)

If only one of candIntraPredModeA and candIntraPredModeB is the angular mode, the candidate mode lists may be determined as follows. That is, when combined with the preceding conditions, candIntraPredModeA and candIntraPredModeB are not the same, and only one of candIntraPredModeA and candIntraPredModeB is the angular mode.

$$-candModeList[0] = \max AB$$

$$-candModeList[1] = \text{INTRA\_DC}$$

$$-candModeList[2] = 2 + ((\max AB + 61)\,\%64)$$

$$-candModeList[3] = 2 + ((\max AB - 61)\,\%64)$$

$$-candModeList[4] = 2 + ((\max AB + 60)\,\%64)$$

In other cases, the candidate mode lists may be determined as follows. That is, 1) if candIntraPredModeA and candIntraPredModeB are the same, and candIntraPredModeA is the non-angular mode, or 2) if candIntraPredModeA and candIntraPredModeB are not the same, and both candIntraPredModeA and candIntraPredModeB are the non-angular, the candidate mode lists may be determined as follows.

candModeList[0]=INTRA_DC
candModeList[1]=INTRA_ANGULAR50
candModeList[2]=INTRA_ANGULAR18
candModeList[3]=INTRA_ANGULAR46
candModeList[4]=INTRA_ANGULAR54

Here, INTRA_ANGULARxx may be a value corresponding to mode index (or mode number) xx.

FIG. 21 is a diagram illustrating an intra prediction mode deriving method according to an embodiment of the present disclosure.

As described in FIG. 20, a preconfigured mode indicated by a planar flag may exist, a mode included in candidate mode lists may exist, and other modes may exist. According to an embodiment of the present disclosure, if a planar flag is 1, IntraPredModeY may be configured to a preconfigured mode. Referring to FIG. 21, if the planar flag is 1, IntraPredModeY may be configured to INTRA_PLANAR.

According to an embodiment of the present disclosure, in order to indicate a mode included in the candidate mode lists, an MPM flag may be referred to. If the MPM flag is 1, IntraPredModeY may be configured to candModeList[intra_luma_mpm_idx]. Referring to FIG. 21, if the planar flag is 0 and the MPM flag is 1, IntraPredModeY may be configured to candModeList[intra_luma_mpm_idx].

According to an embodiment of the present disclosure, a combination of the planar flag and the MPM flag may be used to determine whether IntraPredModeY is a preconfigured mode, a mode included in the candidate mode lists, or other modes. For example, if the planar flag is 1, IntraPredModeY may be a preconfigured mode. If the planar flag is 0 and the MPM flag is 1, IntraPredModeY may be a mode included in the candidate mode lists. If the planar flag is 0 and the MPM flag is 0, IntraPredModeY may be other modes.

According to another embodiment of the present disclosure, a combination of the planar flag and the MPM flag may be used to determine whether IntraPredModeY is a preconfigured mode, a mode included in the candidate mode lists, or other modes. For example, if the planar flag is 1 and the MPM flag is 1, IntraPredModeY may be a preconfigured mode. If the planar flag is 0 and the MPM flag is 1, IntraPredModeY may be a mode included in the candidate mode lists. If the MPM flag is 0, IntraPredModeY may be other modes.

As described below, an intra prediction mode in a case of other modes may be induced.

As described in FIG. 20, the number of elements in the candidate mode lists may be five. The candidate mode lists may not always include INTRA_PLANAR. The candidate mode lists may always include INTRA_DC. In this embodiment, descriptions overlapping with those in FIG. 17 to FIG. 20 may be omitted.

As an embodiment, if other modes are indicated, candidate mode list rearrangement and IntraPredModeY configuration may be performed. Candidate mode lists before rearrangement may be MPM lists. The rearrangement may be rearrangement of candidate mode list values. For example, when candidate mode lists before rearrangement are candModeList[0]=a_0, candModeList[1]=a_1, candModeList[2]=a_2, . . . , and candModeList[N−1]=a_{N−1}, a_0, a_1, a_2, . . . , and a_{N−1} may be arranged and input to candModeList[0], candModeList[1], candModeList[2], . . . , and candModeList[N−1]. Here, arrangement may be performed in ascending or descending order. For example, when a_0, a_1, a_2, . . . , and a_{N−1} are arranged in ascending order, the arrangement may result in b_0, b_1, b_2, . . . , and b_{N−1}, and configuration may be performed to candModeList[0]=b_0, candModeList[1]=b_1, candModeList[2]=b_2, . . . , and candModeList[N−1]=b_{N−1}.

A part indicated by (1.) of FIG. 21 may correspond to rearrangement of the candidate mode lists. For example, candModeList[i] may be defined from i=0 to N−1. In this case, with respect to i that is from 0 to (N−2), and j that is from (i+1) to (N−1) for each i, if candModeList[i] is greater than candModeList[j], values of candModeList[i] and candModeList[j] may be swapped. A swap operation may be expressed as (candModeList[i], candModeList[j])=Swap(candModeList[i], candModeList[j]). A result of Swap(x, y) may be (y, x). Therefore, the operation of (candModeList[i], candModeList[j])=Swap(candModeList[i], candModeList[j]) may cause candModeList[i] and candModeList[j], which are a and b respectively before the operation is performed, to become candModeList[i] and candModeList[j] which are b and a respectively after the operation is performed. Referring to FIG. 21, N may be 5. In candModeList[i], i may be configured from 0 to 4.

Referring to FIG. 21, in a part indicated by (1.) of FIG. 21, candidate mode list rearrangement may be performed. For example, in candModeList[i], i may be defined from 0 to 4. That is, the candidate mode lists may have a total of 5 elements. In this case, with respect to i that is from 0 to 3 and j that is from (i+1) to 4 for each i, if candModeList[i] is greater than candModeList[j], values of candModeList[i] and candModeList[j] may be swapped. A swap operation may be expressed as (candModeList[i], candModeList[j])=Swap(candModeList[i], candModeList[j]).

IntraPredModeY configuration may be based on an intra_luma_mpm_remainder value. Referring to FIG. 21, IntraPredModeY may be configured based on intra_luma_mpm_remainder. Modification of IntraPredModeY may follow. In this case, modification of IntraPredModeY without being based on the candidate mode lists, and modification of IntraPredModeY on the basis of the candidate mode lists may be included.

According to an embodiment, intra_luma_mpm_remainder may be a syntax element. Further, intra_luma_mpm_remainder may be a value signaled when other modes are indicated. For example, intra_luma_mpm_remainder may be a value signaled when the MPM flag is 0. Alternatively, intra_luma_mpm_remainder may be a value signaled when both the planar flag and the MPM flag are 0. In intra_luma_mpm_remainder, a value smaller than a total number of intra modes may be a maximum value. For example, in intra_luma_mpm_remainder, ((total number of intra modes in signaling range)−(number of preconfigured modes)−(number of MPM list elements)−1) may have a maximum value. For example, (total number of intra modes in signaling range) may be 67. For example, (number of preconfigured modes) may be 1. For example, (number of MPM list elements) may be 5. For example, a maximum value of intra_luma_mpm_remainder may be 60.

According to an embodiment of the present disclosure, modification of IntraPredModeY may include performing the preconfigured modification without being based on the candidate mode lists. For example, modification of IntraPredModeY may include adding a preconfigured value to IntraPredModeY. Referring to a part indicated by (ii.) of FIG. 21, a value obtained by adding 1 to an IntraPredModeY value may be configured as IntraPredModeY. This may be because the preconfigured mode is signaled separately from a mode belonging to the candidate mode lists.

According to an embodiment of the present disclosure, modification of IntraPredModeY may include modifying IntraPredModeY on the basis of the candidate mode lists. For example, with respect to i that is from 0 to N−1, if IntraPredModeY is greater than or equal to candModeList [i], 1 may be added to IntraPredModeY. A value based on IntraPredModeY, which is generated as a result of the addition, may be used for an intra prediction mode. For example, wide angle determination and mode modification processes may be performed after IntraPredModeY derivation described in the present disclosure. Referring to FIG. 21, the processes may be procedures performed in a part indicated by (iii.) of FIG. 21. For example, N may be 5. In a case where i may be configured from 0 to 4, if IntraPredModeY is greater than or equal to candModeList[i] with respect to i of 0 to 4, candModeList[i] may add 1 to IntraPredModeY. The aforementioned modification of IntraPredModeY may be necessary because, if the MPM flag is 0, signaling is performed using intra_luma_mpm_remainder from among modes other than those included in the mode list. For example, this is because, in a case where candModeList[0]=64, candModeList[1]=3, candModeList [2]=1, candModeList[3]=5, candModeList[4]=33, when a value included in the candidate mode lists is signaled, the MPM flag or the planar flag may be 1, and when a mode other than the preconfigured mode and the mode belonging to the candidate mode lists is signaled, possible values of IntraPredModeY are 2, 4, 6, . . . , 32, 34, . . . , 63, 65, 66, and the like. In this case, when intra_luma_mpm_remainder is signaled with 0, this may indicate IntraPredModeY 2.

FIG. 22 is a diagram illustrating an intra prediction mode deriving method according to an embodiment of the present disclosure. As described in FIG. 22, a preconfigured mode indicated by a planar flag may exist, a mode included in candidate mode lists may exist, and other modes may exist. According to an embodiment of the present disclosure, if a planar flag is 1, IntraPredModeY may be configured to a preconfigured mode. Referring to FIG. 22, if the planar flag is 1, IntraPredModeY may be configured to INTRA_PLANAR.

According to an embodiment of the present disclosure, in order to indicate a mode included in the candidate mode lists, an MPM flag may be referred to. If the MPM flag is 1, IntraPredModeY may be configured to candModeList[intra_luma_mpm_idx]. Referring to FIG. 15, if the planar flag is 0 and the MPM flag is 1, IntraPredModeY may be configured to candModeList[intra_luma_mpm_idx].

According to an embodiment of the present disclosure, a combination of the planar flag and the MPM flag may be used to determine whether IntraPredModeY is a preconfigured mode, a mode included in the candidate mode lists, or other modes. For example, if the planar flag is 1, IntraPredModeY may be a preconfigured mode. If the planar flag is 0 and the MPM flag is 1, IntraPredModeY may be a mode included in the candidate mode lists. If the planar flag is 0 and the MPM flag is 0, IntraPredModeY may be other modes.

According to another embodiment of the present disclosure, a combination of the planar flag and the MPM flag may be used to determine whether IntraPredModeY is a preconfigured mode, a mode included in the candidate mode lists, or other modes. For example, if the planar flag is 1 and the MPM flag is 1, IntraPredModeY may be a preconfigured mode. If the planar flag is 0 and the MPM flag is 1, IntraPredModeY may be a mode included in the candidate mode lists. If the MPM flag is 0, IntraPredModeY may be other modes.

As described below, an intra prediction mode in a case of other modes may be induced.

As described in FIG. 22, the number of elements in the candidate mode lists may be five. The candidate mode lists may not always include INTRA_PLANAR. The candidate mode lists may always include INTRA_DC.

In this embodiment, descriptions overlapping with those in FIG. 17 to FIG. 21 may be omitted.

As an embodiment, if other modes are indicated, candidate mode list rearrangement and IntraPredModeY configuration may be performed. In this embodiment, descriptions of rearrangement may refer to FIG. 21.

Referring to FIG. 21, in a part indicated by (1.) of FIG. 21, candidate mode list rearrangement may be performed. For example, in candModeList[i], i may be defined from 0 to 4. That is, the candidate mode lists may have a total of 5 elements. In this case, with respect to i that is from 0 to 3 and j that is from (i+1) to 4 for each i, if candModeList[i] is greater than candModeList[j], values of candModeList[i] and candModeList[j] may be swapped. A swap operation may be expressed as (candModeList[i], candModeList[j]) =Swap(candModeList[i], candModeList[j]).

The mode driving method described in FIG. 21 may include a redundant operation. For example, when the MPM list configuration method described in FIG. 18 or FIG. 22 is used, the mode driving method described in FIG. 21 may include a redundant operation.

IntraPredModeY configuration may be based on an intra_luma_mpm_remainder value. Referring to FIG. 21, IntraPredModeY may be configured based on intra_luma_mpm_remainder. Modification of IntraPredModeY may follow. In this case, modification of IntraPredModeY without being based on the candidate mode lists, and modification of IntraPredModeY on the basis of the candidate mode lists may be included. According to an embodiment, intra_luma_mpm_remainder may be a syntax element, and descriptions thereof may refer to FIG. 21.

According to an embodiment of the present disclosure, modification of IntraPredModeY may include performing a preconfigured modification without being based on the candidate mode lists. For example, modification of IntraPredModeY may include adding a preconfigured value to IntraPredModeY. Referring to a part indicated by (ii.) of FIG. 22, a value obtained by adding 2 to an IntraPredModeY value may be configured as IntraPredModeY.

According to an embodiment of the present disclosure, modification of IntraPredModeY may include modifying IntraPredModeY on the basis of the candidate mode lists. For example, IntraPredModeY is compared with candModeList[i], and if a condition is satisfied, modification of IntraPredModeY may be performed. According to an embodiment of the present disclosure, when comparison with candModeList[i] is performed and IntraPredModeY is modified, comparison and modification may be performed only for some of candidate mode lists, not for all the candidate mode lists. That is, when candModeList[i] is defined for i that is from 0 to N−1, comparison and modification may be performed only for fewer candidate mode lists than N, not for all the candidate mode lists. A candidate mode list, for which comparison and modification are not performed, may be preconfigured. For example, the candidate mode list, for which comparison and modification are not performed, may be related to a mode index to be included in several cases in a configuration method which varies depending on a case in the MPM list configuration. For example, comparison with IntraPredModeY and modification of IntraPredModeY may be performed only for candidate mode lists remaining after excluding candModeList[0].

For example, when candModeList[i] is defined from i=0 to N−1, comparison with IntraPredModeY and modification of IntraPredModeY may be performed with respect to i having a value larger than 0 to a value of (N−1). For example, when candModeList[i] is defined from i=0 to N−1, comparison with IntraPredModeY and modification of IntraPredModeY may be performed with respect to i that is from 1 to (N−1).

For example, comparison and modification may be as follows. For example, if IntraPredModeY is greater than or equal to candModeList[i], modification of IntraPredModeY may be performed. For example, if IntraPredModeY is greater than or equal to candModeList[i], an IntraPredModeY value may be increased by 1.

Referring to a part indicated by (iii.) of FIG. 22, if IntraPredModeY is greater than or equal to candModeList[i] with respect to i that is 1 to 4, IntraPredModeY may be increased by 1. This is because the candidate mode lists may always include certain mode indices. This is also because a fixed mode index may exist at a certain position in the rearranged candidate mode lists. For example, this is because candModeList[0] may always be INTRA_DC in the rearranged candidate mode lists.

According to an embodiment of the present disclosure, in modification of IntraPredModeY, the preconfigured value during the preconfigured modification performed without being based on the candidate mode lists may be associated with the number of candidate mode lists excluded from comparison targets during modification of IntraPredModeY performed based on the candidate mode lists. For example, if M out of all the candidate mode lists are excluded from the comparison targets during modification of IntraPredModeY performed based on the candidate mode lists, the preconfigured value during the preconfigured modification performed without being based on the candidate mode lists may be M or greater. More specifically, for example, if M out of all the candidate mode lists are excluded from the comparison targets during modification of IntraPredModeY performed based on the candidate mode lists, the preconfigured value during the preconfigured modification performed without being based on the candidate mode lists may be greater than M. For example, M may be 1.

In modification of IntraPredModeY, the preconfigured value and the number of preconfigured modes may be associated in the preconfigured modification performed without being based on the candidate mode lists. For example, if the number of preconfigured modes is L, the preconfigured value may be L or greater in the preconfigured modification performed without being based on the candidate mode lists. More specifically, for example, if the number of preconfigured modes is L, the preconfigured value may be greater than L in the preconfigured modification performed without being based on the candidate mode lists. For example, L may be 1.

Accordingly, referring to FIG. 22, modification of IntraPredModeY may be as follows. An IntraPredModeY value may be configured to an intra_luma_mpm_remainder value. The IntraPredModeY value may be increased by 2. With respect to i that is 1 to 4 (inclusive), when IntraPredModeY is greater than or equal to candModeList[i], IntraPredModeY may be increased by 1.

Figure 23:
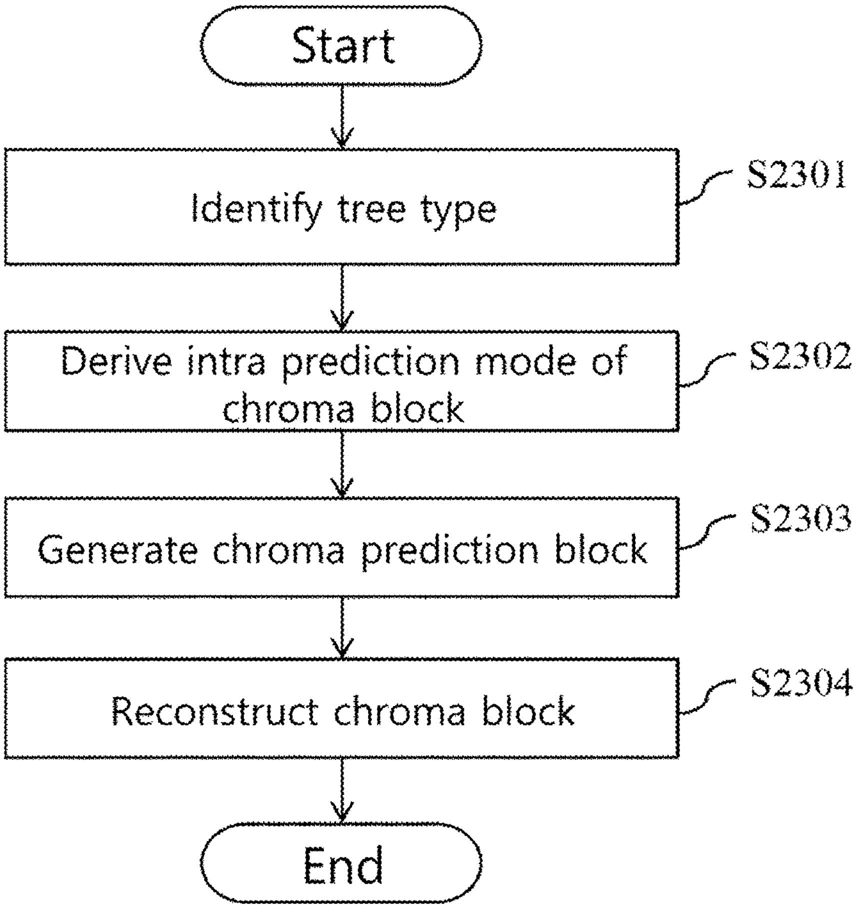
FIG. 23 is a flowchart illustrating a video signal processing method according to an embodiment of the present disclosure.

FIG. 23 is a flowchart illustrating a video signal processing method according to an embodiment of the present disclosure. Referring to FIG. 23, for convenience of explanation, descriptions are provided mainly based on a decoder, but the present disclosure is not limited thereto. Further, a video signal processing method according to an embodiment of the present disclosure may be applied to an encoder in substantially the same way.

A decoder checks a tree type of a current chroma block (S2301).

The decoder derives a chroma intra prediction mode of the current chroma block on the basis of a luma intra prediction mode of a preconfigured position (S2302).

The decoder generates a prediction block of the current chroma block on the basis of the chroma intra prediction mode (S2303).

The decoder reconstructs the current chroma block by adding a residual block of the current chroma block to the prediction block (S2304).

The video signal processing method is provided, wherein, when a luma prediction mode of the preconfigured position is an intra block copy mode, the luma intra prediction mode is configured to a preconfigured mode.

As described above, the deriving of the chroma intra prediction mode may include acquiring a first syntax element in which a mode index indicates the current chroma intra prediction mode within a preconfigured mapping table according to the luma intra prediction mode.

As described above, the preconfigured position may be a luma position of a bottom right center sample position of the current chroma block.

As described above, the preconfigured mode may be an intra DC mode.

As described above, when the tree type of the current chroma block is a dual tree, a second syntax element, which indicates whether an intra block copy mode is applied to the current chroma block, may be inferred to be a preconfigured value without being parsed.

As described above, when the preconfigured value may be 0 and the tree type of which is the dual tree, an intra block copy mode may not be applied to the current chroma block.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

INDUSTRIAL APPLICABILITY

The aforementioned preferred embodiments of the present disclosure are disclosed for the purpose of illustration, and those skilled in the art can improve, change, replace, or add various other embodiments within the technical spirit and technical scope of the present disclosure provided in the appended claims below.

The invention claimed is:

1. A device for decoding a video signal, the device comprising a processor, wherein the processor is configured to:

derive a chroma intra prediction mode of a current block based on a luma intra prediction mode of the current block, wherein the luma intra prediction mode of the current block is derived based on a prediction mode of a specific location of the current block, obtain a value of a first syntax element indicating whether the specific location of the current block is coded in an intra block copy mode, reconstruct the current block based on the chroma intra prediction mode of the current block, wherein when the value of the first syntax element indicates that the specific location of the current block is coded in the intra block copy mode, the luma intra prediction mode of the current block is equal to an intra DC mode, wherein when the value of the first syntax element indicates that the specific location of the current block is not coded in the intra block copy mode, the luma intra prediction mode of the current block is equal to a luma intra prediction mode of the specific location, wherein the first syntax element is parsed based on a tree type of the specific location of the current block, wherein when a top-left location of the current block is (xCb, yCb), the specific location is (xCb+cbWidth/2, yCb+cbHeight/2), and wherein the cbWidth is a width of the current block, and the cbHeight is a height of the current block.

2. The device of claim 1, wherein when the tree type of the specific location of the current block is not a DUAL_TREE_CHROMA, the first syntax element is parsed, and the value of the first syntax element is obtained based on parsing result of the first syntax element, wherein when the tree type of the specific location of the current block is the DUAL_TREE_CHROMA, the first syntax element is not parsed and the value of the first syntax element is inferred as a value indicating that the specific location of the current block is not coded in the intra block copy mode.

3. The device of claim 1, wherein the processor is configured to obtain a value of a second syntax element indicating the chroma intra prediction mode within a preconfigured mapping table according to the luma intra prediction mode of the current block.

4. A device for encoding a video signal, the device comprising a processor, wherein the processor is configured to obtain a bitstream to be decoded by a decoder using a decoding method, the decoding method comprising:

deriving a chroma intra prediction mode of a current block based on a luma intra prediction mode of the current block, wherein the luma intra prediction mode of the current block is derived based on a prediction mode of a specific location of the current block;

obtaining a value of a first syntax element indicating whether the specific location of the current block is coded in an intra block copy mode; and reconstructing the current block based on the chroma intra prediction mode of the current block, wherein when the value of the first syntax element indicates that the specific location of the current block is coded in the intra block copy mode, the luma intra prediction mode of the current block is equal to an intra DC mode, wherein when the value of the first syntax element indicates that the specific location of the current block is not coded in the intra block copy mode, the luma intra prediction mode of the current block is equal to a luma intra prediction mode of the specific location, wherein the first syntax element is parsed based on a tree type of the specific location of the current block, wherein when a top-left location of the current block is (xCb, yCb), the specific location is (xCb+cbWidth/2, yCb+cbHeight/2), and wherein the cbWidth is a width of the current block, and the cbHeight is a height of the current block.

5. The device of claim 4, wherein when the tree type of the specific location of the current block is not a DUAL_TREE_CHROMA, the first syntax element is parsed, and the value of the first syntax element is obtained based on parsing result of the first syntax element, wherein when the tree type of the specific location of the current block is the DUAL_TREE_CHROMA, the first syntax element is not parsed and the value of the first syntax element is inferred as a value indicating that the specific location of the current block is not coded in the intra block copy mode.

6. The device of claim 4, the decoding method further comprising:

obtaining a value of a second syntax element indicating the chroma intra prediction mode within a preconfigured mapping table according to the luma intra prediction mode of the current block.

7. A non-transitory computer-readable medium storing instructions, which when executed by at least one processor perform a decoding method, the decoding method, comprising:

deriving a chroma intra prediction mode of a current block based on a luma intra prediction mode of the current block, wherein the luma intra prediction mode of the current block is derived based on a prediction mode of a specific location of the current block;

obtaining a value of a first syntax element indicating whether the specific location of the current block is coded in an intra block copy mode; and reconstructing the current block based on the chroma intra prediction mode of the current block, wherein when the value of the first syntax element indicates that the specific location of the current block is coded in the intra block copy mode, the luma intra prediction mode of the current block is equal to an intra DC mode, wherein when the value of the first syntax element indicates that the specific location of the current block is not coded in the intra block copy mode, the luma intra prediction mode of the current block is equal to a luma intra prediction mode of the specific location, wherein the first syntax element is parsed based on a tree type of the specific location of the current block, wherein when a top-left location of the current block is (xCb, yCb), the specific location is (xCb+cbWidth/2, yCb+cbHeight/2), and wherein the cbWidth is a width of the current block, and the cbHeight is a height of the current block.

8. The non-transitory computer-readable medium of claim 7, wherein when the tree type of the specific location of the current block is not a DUAL_TREE_CHROMA, the first syntax element is parsed, and the value of the first syntax element is obtained based on parsing result of the first syntax element, wherein when the tree type of the specific location of the current block is the DUAL_TREE_CHROMA, the first syntax element is not parsed and the value of the first syntax element is inferred as a value indicating that the specific location of the current block is not coded in the intra block copy mode.

9. The non-transitory computer-readable medium of claim 7, the decoding method further comprising:

obtaining a value of a second syntax element indicating the chroma intra prediction mode within a preconfigured mapping table according to the luma intra prediction mode of the current block.

* * * * *